(12) United States Patent
Hosseini

(10) Patent No.: US 11,237,056 B2
(45) Date of Patent: Feb. 1, 2022

(54) MONOLITHIC ASSEMBLY OF REFLECTIVE SPATIAL HETERODYNE SPECTROMETER

(71) Applicant: California Institute of Technology, Pasadena, CA (US)

(72) Inventor: Seyedeh Sona Hosseini, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 15/806,305

(22) Filed: Nov. 7, 2017

(65) Prior Publication Data

US 2018/0128683 A1 May 10, 2018

Related U.S. Application Data

(60) Provisional application No. 62/418,578, filed on Nov. 7, 2016, provisional application No. 62/418,640, filed
(Continued)

(51) Int. Cl.
*G01J 3/453* (2006.01)
*G01J 3/18* (2006.01)
(Continued)

(52) U.S. Cl.
CPC ............. *G01J 3/453* (2013.01); *G01J 3/0202* (2013.01); *G01J 3/0205* (2013.01);
(Continued)

(58) Field of Classification Search
CPC .. G01J 3/453; G01J 3/0259; G01J 3/18; G01J 3/0202; G01J 2003/1208; G01J 2003/1204; G01J 2003/1861
See application file for complete search history.

(56) References Cited

U.S. PATENT DOCUMENTS 4,487,478 A * 12/1984 Jackson .................. H01S 3/005
356/519
5,030,007 A * 7/1991 Calhoun .............. G01B 5/0004
356/451
(Continued)

FOREIGN PATENT DOCUMENTS

CN 102072769 A 5/2011
CN 102486408 A 6/2012
(Continued)

OTHER PUBLICATIONS

Calvet et al., "The Structure and Emission of the Accretion Shock in T Tauri Stars", The Astrophysical Journal, Dec. 20, 1998. vol. 509, pp. 802-818.
(Continued)

*Primary Examiner* — Hwa Andrew Lee
(74) *Attorney, Agent, or Firm* — KPPB LLP

(57) ABSTRACT

Novel monolithic cyclical reflective spatial heterodyne spectrometers (CRSHS) are presented. Monolithic CRSHS in accordance with the invention have a single frame wherein a flat mirror, roof mirror, and symmetric grating are affixed. The invention contains only fixed parts; the flat mirror, roof mirror, and symmetric grating do not move in relation to the frame. Compared to conventional CRSHS known in the art, the present invention enables much smaller and lighter CRSHS, requires less time and skill for maintenance, and is a better economic option. The disclosed invention may include fixed field-widening optical elements or a fiber-fed assembly.

20 Claims, 10 Drawing Sheets

Related U.S. Application Data on Nov. 7, 2016, provisional application No. 62/465,036, filed on Feb. 28, 2017.

(51) Int. Cl.
  *G01J 3/02* (2006.01)
  *G01J 3/12* (2006.01)

(52) U.S. Cl.
  CPC ........... *G01J 3/0218* (2013.01); *G01J 3/0259* (2013.01); *G01J 3/18* (2013.01); *G01J 3/1804* (2013.01); *G01J 3/4531* (2013.01); *G01J 3/4532* (2013.01); *G01J 2003/1204* (2013.01); *G01J 2003/1208* (2013.01); *G01J 2003/1861* (2013.01)

(56) References Cited

U.S. PATENT DOCUMENTS

| | | | |
|---|---|---|---|
| 5,059,027 | A | 10/1991 | Roesler et al. |
| 7,535,572 | B2 | 5/2009 | Englert |
| 7,773,229 | B2 | 8/2010 | Harlander et al. |
| 7,903,252 | B2* | 3/2011 | Larsen ................ G01J 3/0262 356/451 |
| 8,018,597 | B2 | 9/2011 | Scott |
| 8,355,120 | B2 | 1/2013 | Englert et al. |
| 2005/0094155 | A1* | 5/2005 | Hill ................... G03F 7/70858 356/500 |
| 2005/0248769 | A1 | 11/2005 | Weitzel |
| 2009/0051899 | A1 | 2/2009 | Harlander et al. |
| 2009/0231592 | A1 | 9/2009 | Harlander et al. |
| 2013/0135622 | A1* | 5/2013 | Bleier ..................... H03L 5/00 356/451 |
| 2013/0188181 | A1 | 7/2013 | Angel et al. |
| 2014/0029004 | A1 | 1/2014 | Bodkin |
| 2015/0030503 | A1* | 1/2015 | Angel .................... G01J 3/44 422/82.05 |
| 2015/0241280 | A1 | 8/2015 | Lenzner |
| 2016/0138903 | A1 | 5/2016 | Zhang et al. |

FOREIGN PATENT DOCUMENTS

| | | |
|---|---|---|
| CN | 105318969 A | 2/2016 |
| KR | 1020120042694 A | 5/2012 |
| WO | 2018085863 A1 | 5/2018 |

OTHER PUBLICATIONS

Chakrabarti et al., "Self-compensating, all-reflection interferometer", Applied Optics, May 1, 1994, vol. 33, No. 13, pp. 2596-2607.
Charbonneau et al., "Detection of an Extrasolar Planet Atmosphere", The Astrophysical Journal, Nov. 19, 2001, vol. 568, No. 1, 26 pgs.
Chassefiere et al., "Atomic hydrogen and helium densities of the interstellar medium measured in the vicinity of the sun", Astronomy & Astrophysics, 1986, vol. 160, pp. 229-242.
Combi et al., "Hubble Space Telescope Ultraviolet imaging and high-resolution spectroscopy of water photodissociation products in Comet Hyakutake (C/1996 B2)", The Astrophysical Journal, Feb. 20, 1998, vol. 494, pp. 816-821.
Combi et al., "SOHO/SWAN Observations of the Structure and Evolution of the Hydrogen Lyman a Coma of Comet Hale-Bopp (1995 O1)", Icarus, 2000, vol. 144, pp. 191-202.
Damiani et al., "An Imaging Heterodyne Spectometer for Planetary Exploration", Optical Society of America, OSA Technical Digest Series, Fourier Transform Spectroscopy/ Hyperspectral Imaging and Sounding of the Environment, Feb. 11-15, 2007, 3 pgs.
Dawson et al., "Tunable, all-reflective spatial heterodyne spectrometer for broadband spectral line studies in the visible and near-ultraviolet", Applied Optics, Jul. 20, 2009, vol. 48, No. 21, pp. 4227-4238.

Dohi et al., "Attainment of High Resolution Holographic Fourier Transform Spectroscopy", Applied Optics, May 1971, vol. 10, No. 5, pp. 1137-1140.
Dohlen, "Design of an Interferometric Spectrometer for Environmental Surveillance", Thesis, University of London, Oct. 16, 1993, 217 pgs.
Dubessy et al., "Instrumentation in Raman Spectroscopy: Elementary Theory", Universite de Lorraine, GeoResources, 2016, VIII International Siberian Early Career GeoScientists Conference, 38 pgs.
Ehrenreich et al., "A giant comet-like cloud of hydrogen escaping the warm Neptune-mass exoplanet GJ 436b", Nature, Jun. 25, 2015, vol. 522, No. 7557, pp. 459-461.
Englert et al., "High sensitivity trace gas sensor for planetary atmospheres: miniaturized Mars methane monitor", Journal of Applied Remote Sensing, 2014, vol. 8, pp. 083625-1-083625-15.
Englert et al., "Initial ground-based thermospheric wind measurements using Doppler asymmetric spatial heterodyne spectroscopy (DASH)", Optics Express, Dec. 20, 2010, vol. 18, No. 26, pp. 27416-27430.
Englert et al., "Spatial Heterodyne Imager for Mesospheric Radicals on STPSat-1", Journal of Geophysical Research-Atmospheres, Oct. 22, 2010. vol. 115, D20306, 20 pgs.
Englert et al., "Spatial heterodyne spectroscopy for long-wave infrared: first measurements of broadband spectra", Optical Engineering, Oct. 30, 2009, vol. 48, No. 10, pp. 105602-1-105602-9.
Englert et al., "Correction of phase distortion in spatial heterodyne spectroscopy", Applied Optics, Dec. 20, 2004, vol. 43, No. 36, pp. 6680-6687.
Englert et al., "Doppler Asymmetric Spatial Heterodyne Spectroscopy (DASH): An innovative concept for measuring winds in planetary atmospheres", Proc. of SPIE vol. 6303, Atmospheric Optical Modeling, Measurement, and Simulation II, Sep. 1, 2006, 9 pgs.
Englert et al., "Doppler asymmetric spatial heterodyne spectroscopy (DASH): concept and experimental demonstration", Applied Optics, Oct. 10, 2007, vol. 46, No. 29, pp. 7298-7307.
Englert et al., "First results from the Spatial Heterodyne Imager for Mesospheric Radicals (SHIMMER): Diurnal variation of mesospheric hydroxyl", Geographical Research Letters, Oct. 8, 2008, vol. 35, L19813, doi:10.1029/2008GL035420, 5 pgs.
Englert et al., "Flatfielding in spatial heterodyne spectroscopy", Applied Optics, Jul. 1, 2006, vol. 45, No. 19, pp. 4583-4590.
Englert et al., "Michelson Interferometer for Global High-Resolution Thermospheric Imaging (MIGHTI): Instrument Design and Calibration", Space Science Reviews, Oct. 2017, vol. 212, No. 1-2, 32 pgs., doi: 10.1007/s11214-017-0358-4.
Englert et al., "MIGHTI: The Spatial Heterodyne Instrument for Thermospheric Wind Measurements on Board the ICON Mission", Optical Society of America, Fourier Transform Spectroscopy, Mar. 1-4, 2015, 3 pgs.
Englert et al., "Spatial heterodyne spectroscopy at the Naval Research Laboratory", Applied Optics, Nov. 1, 2015, vol. 54, No. 31, pp. F158-F163.
Englert et al., "Spatial Heterodyne Spectroscopy: An Emerging Optical Technique for Heliophysics and Beyond", Concept Paper For NRC Space Studies Board, Oct. 2010, 7 pgs.
Erskine, "An Externally Dispersed Interferometer Prototype for Sensitive Radial Velocimetry: Theory and Demonstration on Sunlight", Publications of the Astronomical Society of the Pacific, Feb. 2003, vol. 115, pp. 255-269.
Fink, "A taxonomic survey of comet composition 1985-2004 using CCD spectroscopy", Icarus, Jan. 27, 2009, vol. 201, pp. 311-334.
Florjanczyk et al., "Development of a slab waveguide spatial heterodyne spectrometer for remote sensing", Proc. of SPIE vol. 7594, Feb. 17, 2010, 10 pgs.
Fontaine et al., "Fourier-transform, integrated-optic spatial heterodyne spectrometer on a silica-based planar waveguide with 1GHz resolution", Optics Letters, Aug. 15, 2011, vol. 36, No. 16. pp. 3124-3126.
Ford et al., "Overview of the advanced camera for surveys on-orbit performance", Proc. SPIE 4854, 2003, pp. 81-94.

(56) References Cited

OTHER PUBLICATIONS

Formisano et al., "Detection of Methane in the Atmosphere of Mars", Science, Dec. 3, 2004, vol. 306, pp. 1758-1761.

Fossati et al., "Absorbing Gas around the Wasp-12 Planetary System", The Astrophysical Journal Letters, Apr. 1, 2013, vol. 766: L20, 6 pgs.

Fossati et al., "Characterising exoplanets and their environment with UV transmission spectroscopy", eprint arXiv: 1503.01278v1, Mar. 4, 2015, 4 pgs.

Foster et al., "Spatial-heterodyne spectrometer for transmission-Raman observations", Optics Express, Jan. 23, 2017, vol. 25, No. 2, pp. 1598-1604.

France et al., "The far-ultraviolet "continuum" in protoplanetary disk systems. I. Electron-impact H2 and accretion shocks", The Astrophysical Journal, Mar. 1, 2011, vol. 729: 7, pp. 1-12.

Fray et al., "Sublimation of ices of astrophysical interest: A bibliographic review", Planetary and Space Science, Sep. 20, 2009, vol. 57 vol. 14-15, pp. 2053-2080.

Frisch et al., "The Galactic Environment of the Sun: Interstellar Material Inside and Outside of the Heliosphere", Space Science Reviews, May 14, 2009, vol. 146, pp. 235-273.

Gardner et al., "First performance results of a new field-widened spatial heterodyne spectrometer for geocoronal Ha research", Journal of Geophysical Research: Space Physics, Jan. 9, 2017, vol. 122, pp. 1373-1385, doi: 10.1002/2016JA022625.

Gaudi, "Exoplanet program analysis group report", 223rd AAS Meeting, Washington, DC, Apr. 2013, 19 pgs.

Gaudi et al., "Exoplanet Exploration Program Analysis Group (ExoPAG) Report to Paul Hertz Regarding Large Mission Concepts to Study for the 2020 Decadal Survey", Large Mission Concepts for Study, Oct. 6, 2015, 22 pgs.

Ghaffarian, "Update on CGA packages for space applications", Microelectronics Raliability, 2016. 11881, 41 pgs.

Gomer, "The Development of a Spatial Heterodyne Spectrometer for Raman Spectroscopy", Thesis, University of South Carolina, 2012, 24 pgs.

Gomer et al., "Raman Spectroscopy Using a Spatial Heterodyne Spectrometer: Proof of Concept", Applied Spectroscopy, May 11, 2011, vol. 65, No. 8, pp. 849-857.

Gomer et al., "The development of a wide-field, high-resolution UV Raman hyperspectral imager", Proceedings of the SPIE, vol. 9455, Chemical, Biological, Radiological, Nuclear, and Explosives (CBRNE) Sensing XVI, May 19, 2015, 9 pgs.

Guillot et al., "Giant Planets at Small Orbital Distances", Astrophysical Journal Letters, 1996, 19 pgs.

Guyon, "Limits of adaptive optics for high-contrast imaging", The Astrophysical Journal, Aug. 10, 2005, vol. 629, pp. 592-614.

Guyon et al., "Theoretical limits on extrasolar terrestrial planet detection with coronagraphs", The Astrophysical Journal, Nov. 2006, vol. 167, pp. 81-99.

Hallis et al., "Evidence for primordial water in Earth's deep mantle", Science, Nov. 13, 2015, vol. 350, pp. 795-797.

Harding et al., "The MIGHTI Wind Retrieval Algorithm: Description and Verification", Space Science Reviews, Apr. 10, 2017, doi: 10.1007/s11214-017-0359-3, 16 pgs.

Harlander et al., "Spatial heterodyne spectroscopy for the exploration of diffuse interstellar emission lines at far-ultraviolet wavelengths", The Astrophysical Journal, Sep. 10, 1992, vol. 396, pp. 730-740.

Harlander, "Spatial Heterodyne Spectroscopy: Interferometric Performance at any Wavelength Without Scanning", Thesis, University of Wisconsin-Madison, 1991, 193 pgs.

Harlander et al., "A Differential, Field-Widened Spatial Heterodyne Spectrometer for Investigations at High Spectral Resolution of the Diffuse Far Ultraviolet 1548 A Emission Line from the Interstellar Medium", SPIE vol. 2006, Nov. 19, 1993, pp. 139-148.

Harlander et al., "A High Resolution Broad Spectral Range Spatial Heterodyne Spectrometer for UV Laboratory Astrophysics", Optical Society of America, OSA Technical Digest Series, Fourier Transform Spectroscopy/Hyperspectral Imaging and Sounding of the Environment, Feb. 11-15, 2007, 3 pgs.

Harlander et al., "Design and Laboratory Tests of the Michelson Interferometer for Global High-resolution Thermospheric Imaging (MIGHTI) on the Ionospheric Connection Explorer (ICON) Satellite", Optical Society of America, Fourier Transform Spectroscopy, Mar. 1-4, 2015, 3 pgs.

Harlander et al., "Design of a real-fringe DASH interferometer for observations of thermospheric winds from a small satellite", Imaging and Applied Optics, Fourier Transform Spectroscopy, Jun. 23-24, 2013, 3 pgs.

Harlander et al., "Field-widened spatial heterodyne spectroscopy correcting for optical defects and new vacuum ultraviolet performance tests", SPIE vol. 2280, Sep. 16, 1994, pp. 310-319.

Harlander et al., "First results from an all-reflection spatial heterodyne spectrometer with broad spectral coverage", Optics Express, Mar. 15, 2010, vol. 18, No. 6, pp. 6205-6210.

Harlander et al., "Michelson Interferometer for Global High-Resolution Thermospheric Imaging (MIGHTI): Monolithic Interferometer Design and Test", Space Science Reviews, Oct. 2017, vol. 212, No. 1-2, pp. 601-613, doi: 10.1007/s11214-017-0374-4.

Harlander et al., "Robust monolithic ultraviolet interferometer for the SHIMMER instrument on STPSat-1", Applied Optics, May 20, 2003, vol. 42, No. 15, pp. 2829-2834.

Harlander et al., "SHIMMER: a spatial heterodyne spectrometer for remote sensing of Earth's middle atmosphere", Applied Optics, Mar. 1, 2002, vol. 41, No. 7, pp. 1343-1352.

Harlander et al., "Sounding rocket payload designed for investigations of the distribution and dynamics of the hot component of the interstellar medium using a field-widened spatial heterodyne spectrometer", SPIE vol. 2518, Sep. 1, 1995, pp. 132-140.

Harlander et al., "Spatial heterodyne spectroscopy: a novel interferometric technique for ground-based and space astronomy", SPIE vol. 1235, Jul. 1, 1990, doi: 10.1117/12.19125, 13 pgs.

Harlander et al., "Spatial heterodyne spectroscopy: a novel interferometric technique for the FUV", SPIE vol. 1344 EUV, X-Ray, and Gamma-Ray Instrumentation for Astronomy, 1990, pp. 120-131.

Harlander et al., "Spatial Heterodyne Spectroscopy: For High Spectral Resolution Space-Based Remote Sensing", Optics & Photonics News, Jan. 2004. pp. 48-51.

Harlander et al., "Spatial heterodyne spectroscopy: laboratory tests of field-widened, multiple-order, and vacuum ultraviolet systems", SPIE vol. 1743, EUV, X-Ray, and Gamma-Ray Instrumentation for Astronomy III, Oct. 8, 1992, pp. 48-59.

Harris et al., "Applications of reflective spatial heterodyne spectroscopy to UV exploration in the Solar System", Proceedings of SPIE vol. 5488, UV and Gamma-Ray Space Telescope Systems, Oct. 11, 2004, pp. 886-897.

Harris et al., "Environmental testing of an all-reflective spatial heterodyne spectrometer for wide input angle measurements of H Ly-alpha at high spectral Yesolving power", Proc. of SPIE vol. 8443, Space Telescopes and Instrumentation 2012: Ultraviolet to Gamma Ray, Sep. 17, 2012, 8 pgs.

Harris, "Heterodyne spectrometers with very wide bandwidths", Proc. SPIE 4855, Millimeter and Submillimeter Detectors for Astronomy, Feb. 17, 2003, doi: 10.1117/12.459150, 11 pgs.

Harris et al., "A Broadband Spatial Heterodyne Spectrometer for High Resolution Studies of Faint Extended Emission Sources", Optical Society of America, Fourier Transform Spectroscopy/ Hyperspectral Imaging and Sounding of the Environment, Feb. 11-15, 2007, paper FThA6, 3 pgs.

Harris et al., "Applications of spatial heterodyne spectroscopy for remote sensing of diffuse UV-vis emission line sources in the solar system", Journal of Electron Spectroscopy and Related Phenomena, Mar. 14, 2005, vol. 144, pp. 973-977.

Harris et al., "Studies of H Ly-a emissions in the solar neighborhood with the techniques of polarimetry and spatial hetrodyne spectroscopy (SHS)", Proceedings of SPIE vol. 4854, Future EUV/UV and Visible Space Astrophysics Missions and Instrumentation, Feb. 24, 2003, pp. 676-685.

Hartogh et al., "Ocean-like water in the Jupiter-family comet 103P/Hartley 2", Nature, 2011, vol. 478, pp. 218-220.

(56) References Cited

OTHER PUBLICATIONS

Helg et al., "A high-resolution spatial heterodyning interference spectrometer", Optics and Lasers in Engineering, Jul. 27, 1998, vol. 30, pp. 409-420.
Helg et al., "A Novel High-resolution Interference Spectrometer", Optics and Lasers in Engineering, vol. 29, 1998, pp. 413-422.
Hicks et al., "Monolithic achromatic nulling interference coronagraph: design and performance", Applied Optics, Sep. 10, 2009, vol. 48, No. 26, pp. 4963-4977.
Hord et al., "Galileo Ultraviolet Spectrometer experiment", Space Science Reviews, 1992, vol. 60, pp. 503-530.
Hosseini, "Tunable Reflective Spatial Heterodyne Spectrometer: A Technique for High Resolving Power, Wide Field of View Observation of Diffuse Emission Line Sources", Thesis, University of California Davis, 2015, 123 pgs.
Hosseini et al., "Tunable spatial heterodyne spectroscopy (TSHS): a new technique for broadband visible interferometry", Proc. SPIE, Jul. 21, 2010, 7734(77343J), 12 pgs.
Hosseini et al., "First calibration and visible wavelength observations of Khayyam, a tunable spatial heterodyne spectroscopy (SHS)", Proc. SPIE 9147, Aug. 6, 2014, doi: 10.1117/12.2055862, 10 pgs.
Hosseini et al., "Khayyam: a second generation tunable spatial heterodyne spectrometer for observing diffuse emission line targets", Proc. SPIE 8446, Sep. 14, 2011, doi: 10.1117/12.900590, 12 pgs.
Hosseini et al., "Khayyam: a tunable spatial heterodyne spectrometer for observing diffuse emission line targets", Proc. of SPIE vol. 8446, Oct. 5, 2012, doi: 10.1117/12.925513, 12 pgs.
Hu et al., "Photochemistry in terrestrial exoplanet atmospheres. I. Photochemistry model and benchmark cases", The Astrophysical Journal, Dec. 20, 2012, vol. 761:166, 29 pgs.
Hu et al., "Raman spectroscopic detection for liquid and solid targets using a spatial heterodyne spectrometer", Journal of Raman Spectroscopy, Published Oct. 8, 2015, vol. 47, 2016, pp. 289-298.
Hu et al., "Raman spectroscopic detection using a two-dimensional spatial heterodyne spectrometer", Optical Engineering, Nov. 2015, vol. 54, No. 11, 114101-1-114101-9.
Ingleby et al., "Near-Ultraviolet Excess in Slowly Accreting T Tauri Stars: Limits Imposed By Chromospheric Emission", The Astrophysical Journal, Dec. 20, 2011, vol. 743:105, 11 pgs.
Jin et al., "Planetary population synthesis coupled with atmospheric escape: a statistical view of evaporation", The Astrophysical Journal, Sep. 9, 2014, 24 pgs.
John et al., "Optical Designing of Spatial Heterodyne Spectrometer using TracePro", International Journal of Advanced Research in Electrical, Electronics and Instrumentation Engineering, Apr. 2016, vol. 5, No. 4, DOI:10.15662/IJAREEIE.2016.0504141, pp. 2911-2916.
Joyce, "An introduction to infrared detectors", NOAO Gemini Data Workshop, Jul. 19, 2010, 27 pgs.
Kim et al., "Resonance Raman and surface- and tip-enhanced Raman spectroscopy methods to study solid catalysts and heterogeneous catalytic reactions", Chemical Society Reviews, Oct. 19, 2010, DOI: 10.1039/c0cs00044b, 25 pgs.
Kislyakova et al., "Magnetic moment and plasma environment of HD 209458b as determined from Lya observations", Science, Nov. 21, 2014, vol. 346, No. 6212, pp. 981-984.
Kostiuk, "Heterodyne Spectroscopy in the Thermal Infrared Region: A Window on Physics and Chemistry", NASA Technical Reports Server, Feb. 1, 2004, 7 pgs.
Kreidberg et al., "Clouds in the atmosphere of the super-Earth exoplanet GJ1214b", Nature, Jan. 2, 2014, vol. 505, No. 7481, pp. 69-72.
Kulow et al., "Lya Transit Spectroscopy and the Neutral Hydrogen Tail of the Hot Neptune GJ 436b", The Astrophysical Journal, May 10, 2014, vol. 786: 132, 9 pgs.
Lacan et al., "A static Fourier transform spectrometer for atmospheric sounding: concept and experimental implementation", Optics Express, Apr. 12, 2010, vol. 18, No. 8, pp. 8311-8331.

Lafreniere et al., "HST/NICMOS detection of HR 8799 b IN 1998", The Astrophysical Journal, Apr. 1, 2009, vol. 694, pp. L148-L152.
Lamsal, "The Development of a High Resolution Deep- UV Spatial Heterodyne Raman Spectrometer", Thesis, University of South Carolina, 2016, 134 pgs.
Lamsal et al., "Deep-Ultraviolet Raman Measurements Using a Spatial Heterodyne Raman Spectrometer (SHRS)", Applied Spectroscopy, Feb. 19, 2015, vol. 69, No. 5, pp. 525-534.
Lamsal et al., "Performance Assessment of a Plate Beam Splitter for Deep-Ultraviolet Raman Measurements with a Spatial Heterodyne Raman Spectrometer", Applied Spectroscopy, Oct. 5, 2016, vol. 71, No. 6, 2017, pp. 1263-1270.
Lamsal et al., "Remote UV Raman Spectroscopy for Planetary Exploration Using a Miniature Spatial Heterodyne Raman Spectrometer", 47th Lunar and Planetary Science Conference, 2016, 2 pgs.
Rothman et al., "The HITRAN 2008 molecular spectroscopic database", Journal of Quantitative Spectroscopy & Radiative Transfer, Feb. 13, 2009, vol. 110, p. 533-572.
Sahai et al., "A Pilot Deep Survey for X-Ray Emission from fuvAGB Stars", The Astrophysical Journal, Sep. 1, 2015, vol. 810: 77, 9 pgs.
Sahai et al., "Binarity in Cool Asymptotic Giant Branch Stars: A Galex Search for Ultraviolet Excesses", Astrophysical Journal, Jul. 12, 2008, vol. 689(1274), 14 pgs.
Sahai et al., "Multipolar Bubbles and Jets in Low-Excitation Planetary Nebulae: Toward a New Understanding of the Formation and Shaping of Planetary Nebulae", The Astronomical Journal, Sep. 1998, vol. 116, pp. 1357-1366.
Sahai et al., "Strong Variable Ultraviolet Emission from Y Gem: Accretion Activity in an AGB Star with a Binary Companion?", The Astrophysical Journal Letters, Oct. 20, 2011. vol. 740:L39, 4 pgs.
Sahai et al., "The Astrosphere of the Asymptotic Giant Branch Star CIT 6", The Astronomical Journal, Oct. 2014, vol. 148, No. 74, 8 pgs.
Sahai et al., "The Astrosphere of the Asymptotic Giant Branch Star IRC+10216", The Astrophysical Journal Letters, Mar. 10, 2010, vol. 711, pp. L53-L56.
Sahai et al., "Young Planetary Nebulae: Hubble Space Telescope Imaging and a New Morphological Classification System", The Astrophysical Journal, Apr. 2011, vol. 141:134, 31 pgs.
Samuele et al., "Experimental progress and results of a visible nulling coronagraph", IEEE Aerospace Conference, 2007, 9 pgs.
Saur et al., "Plasma Interaction of Io with its plasma torus", Io's Plasma Interaction, 2006, pp. 537-560.
Scott et al., "Spatial Heterodyne Spectrometer for FLEX", Proc. of SPIE vol. 6744, Sensors, Systems, and Next-Generation Satellites XI, Oct. 26, 2007, 11 pgs.
Serio et al., "The variation of Io's auroral footprint brightness with the location of Io in the plasma torus", Icarus, Apr. 27, 2008, vol. 197, No. 1, pp. 368-374.
Sheinis et al., "A spatial heterodyne spectrometer for diffuse H-α spectroscopy", Proc. of SPIE vol. 7014, Jul. 9, 2008, 13 pgs.
Shkolnik et al., "Predicting Lya and Mg II Fluxes from K and M Dwarfs Using Galaxy Evolution Explorer Ultraviolet Photometry", The Astrophysical Journal Letters, Nov. 20, 2014, vol. 796, L20, 6 pgs.
Sirothia et al., "Search for 150 MHz radio emission from extrasolar planets in the TIFR GMRT Sky Survey", Astronomy and Astrophysics, Jan. 7, 2014, vol. 562, A108, 9 pgs.
Slanger et al., "Energetic Oxygen in the Upper Atmosphere and the Laboratory", Chemical Reviews, Aug. 15, 2003, vol. 103, No. 12, 82 pgs.
Smith et al., "Imaging spatial heterodyne spectroscopy: theory and practice", SPE Conference on Infrared Technology and Applications XXV, Orlando, Florida, Apr. 1999, SPIE vol. 3698, pp. 925-931.
Smith et al., "IRISHS, the Infrared Imaging Spatial Heterodyne Spectrometer a new pushbroom Fourier transform ultraspectral imager with no moving parts", SPIE Conference on Infrared Technology and Applications XXV, Orlando, Florida, Apr. 1999, SPIE vol. 3698, pp. 501-509.
Smith et al., "Transport of ionizing radiation in terrestrial-like exoplanet atmospheres", Icarus, Jun. 2, 2004. vol. 171, 59 pgs.

(56) References Cited

OTHER PUBLICATIONS

Snellen et al., "The orbital motion, absolute mass, and high-altitude winds of exoplanet HD209458b", Nature, 2010, 465(7301): pp. 1049-1051.
Squyres et al., "Vision and Voyages for Planetary Science 2013-2022", The National Academies, National Research Council, 2012, 32 pgs.
Steffl, "The Io plasma torus during the Cassini encounter with Jupiter: Temporal, radial and azimuthal variations", 2005 Thesis, University of Colorado at Boulder, Colorado, USA, 219 pgs.
Stevens et al., "The diurnal variation of polar mesospheric cloud frequency near 55°N observed by SHIMMER", Journal of Atmospheric and Solar-Terrestrial Physics, 2009, vol. 71, pp. 401-407.
Stewart, "Design and operation of the Pioneer Venus Orbiter ultraviolet spectrometer", IEEE Transactions on Geoscience and Remote Sensing, Jan. 1980, vol. GE-I8, No. 1, pp. 65-70.
Strange et al., "Transmission Raman Measurements Using a Spatial Heterodyne Raman Spectrometer (SHRS)", Applied Spectroscopy, Mar. 18, 2016, vol. 71, No. 2, pp. 250-257.
Thomas et al., "OGO 5 Measurements of the Lyman Alpha Sky Background", Astronomy & Astrophysics, 1971, vol. 11, pp. 218-233.
Tian et al., "High stellar FUV/NUV ratio and oxygen contents in the atmospheres of potentially habitable planets", Earth and Planetary Science Letters, Jan. 1, 2014, 21 pgs.
Trammell et al., "Hot Jupiter Magnetospheres", The Astrophysical Journal, Feb. 20, 2011, vol. 728:152, 24 pgs.
Vidal-Madjar et al., "An extended upper atmosphere around the extrasolar planet HD209458b", Nature, Mar. 13, 2003. Vol. 442, No. 6928, pp. 143-146.
Vidal-Madjar et al., "Detection of Oxygen and Carbon in the Hydrodynamically Escaping Atmosphere of the Extrasolar Planet HD 209458b", The Astrophysical Journal, Mar. 20, 2004, vol. 604, No. 1, pp. L69-L72.
Vidotto et al., "Early UV ingress in wasp-12b: measuring planetary magnetic fields", The Astrophysical Journal Letters, Oct. 20, 2010, vol. 722, pp. L168-L172.
Wan et al., "Development of stable monolithic wide-field Michelson interferometers", Applied Optics, Jul. 20, 2011, vol. 50, No. 21, pp. 4105-4114.
Watchorn et al., "Evaluation of payload performance for a sounding rocket vacuum ultraviolet spatial heterodyne spectrometer to observe C IV lambda lambda 1550 emissions from the Cygnus Loop", Applied Optics, Jun. 10, 2010, vol. 49, No. 17, pp. 3265-3273.
Watchorn et al., "8446-Angstrom observations of neutral oxygen with the Spatial Heterodyne Spectrometer at Millstone Hill", Proc. of SPIE vol. 7438, Sep. 23, 2009, 11 pgs.
Watchorn et al., "Development of the Spatial Heterodyne Spectrometer for VUV remote sensing of the interstellar medium", Proceedings of SPIE vol. 4498, UV/EUV and Visible Space Instrumentation for Astronomy and Solar Physics, Dec. 10, 2001, pp. 284-295.
Watchorn et al., "First light for the Bowen fluorescence spatial heterodyne spectrometer at Millstone Hill Observatory", Proc. of SPIE vol. 6689, Solar Physics and Space Weather Instrumentation II, Oct. 3, 2007, 9 pgs.
Watchorn et al., "Single- and dual-wavelength monolithic spatial heterodyne spectrometers for Fraunhofer line discrimination spectroscopy", Proc. of SPIE vol. 7457, Aug. 17, 2009, 13 pgs.
Webster et al., "Determining the local abundance of Martian methane and its 13C/12C and D/H isotopic ratios for comparison with related gas and soil analysis on the 2011 Mars Science Laboratory (MSL) mission", Planetary and Space Science, 2011, vol. 59, pp. 271-283.
Webster et al., "Low upper limit to methane abundance on Mars", Science, Sep. 19, 2013, vol. 342: 6156, 5 pgs.
Webster et al., "Mars Methane Detection and Variability at Gale Crater", Science, Jan. 23, 2015, vol. 347, pp. 415-417.
Witte et al., "Recent results on the parameters of the interstellar helium from the ULYSSES/GAS experiment", Space Science Reviews, 1996, vol. 78, pp. 289-296.
Wood et al., "Evidence for a weak wind from the young sun", The Astrophysical Journal Letter, Feb. 1, 2014, vol. 781, L33, 5 pgs.
Woolf, "Signal-to-Noise Ratios in Multiplex and Scanning Spectrometers", Applied Optics, Oct. 1964. vol. 3, No. 10, pp. 1195.
Wu et al., "Stand-off Detection of Chemicals by UV Raman Spectroscopy", Applied Spectroscopy, Feb. 7, 2000, vol. 54, No. 6, pp. 801-806.
Xiangli et al., "Large aperture spatial heterodyne imaging spectrometer Principle and experimental results", Optics Communications, Sep. 14, 2015, vol. 357, pp. 148-155.
Yoshioka et al., "Feasibility study of EUV spectroscopic observation of the Io plasma torus from the earth-orbiting satellite EXCEED", Planetary and Space Science, 2012, vol. 62, pp. 104-110.
Lamsal et al., "Ultraviolet Stand-off Raman Measurements Using a Gated Spatial Heterodyne Raman Spectrometer", Applied Spectroscopy, Aug. 27, 2015, vol. 70, No. 4, 2016, pp. 666-675.
Lamsal et al., "Visible and UV Standoff Raman Measurements in Ambient Light Conditions Using a Gated Spatial Heterodyne Raman Spectrometer", 46th Lunar and Planetary Science Conference, 2015, 2 pgs.
Lanza, "On the correlation between stellar chromospheric flux and the surface gravity of close-in planets", Astronomy & Astrophysics, Nov. 4, 2014, vol. 572, L6, 5 pgs.
Lawler et al., "A broadband, high-resolution spatial heterodyne spectrometer", Physica Scripta, May 19, 2009, T134, 014016, 5 pgs.
Lawler et al., "A Spatial Heterodyne Spectrometer for Laboratory Astrophysics; First Interferogram", NASA Law, Feb. 14-16, 2006, UNLV, Las Vegas, 5 pgs.
Lawler et al., "Broadband, high-resolution spatial heterodyne spectrometer", Applied Optics, Dec. 1, 2008, vol. 47, No. 34, pp. 6371-6384.
Lawson, "Principles of long baseline stellar interferometry", JPL publication 00-009 07/00, Aug. 15-19, 1999, 352 pgs.
Learner et al., "Phase correction of emission line Fourier transform spectra", Journal of the Optical Society of America A, Oct. 1995, vol. 12, No. 10, pp. 2165-2171.
Lederer et al., "Chemical and physical properties of gas jets in comets I. Monte Carlo model of an inner cometary coma", Icarus, 2009, vol. 199, pp. 477-483.
Lenzner et al., "A Sagnac Fourier spectrometer", International Conference on Transparent Optical Networks, Jul. 2-6, 2017, 4 pgs.
Lenzner et al., "Concerning the Spatial Heterodyne Spectrometer", Optics Express, Jan. 22, 2016, vol. 24, No. 2, pp. 1829-1839.
Lewis et al., "Handbook of Raman Spectroscopy, from the Research Laboratory to the Process Line", Marcel Dekker, Inc., New York, Basel, 2001, 1049 pgs. (presented in five parts).
Linsky et al., "The intrinsic extreme ultraviolet fluxes of f5 v to m5 v stars", The Astrophysical Journal, Dec. 12, 2013. 780: 61, 11 pgs.
Litzen et al., "How Fourier Transform Spectroscopy Can Be Used for Measurement of Atomic Parameters of Astrophysical Importance", Laboratory and Astronomical High Resolution Spectra, ASP Conference Series, vol. 81, 1995, pp. 167-181.
Llama et al., "Transiting the Sun: the Impact of Stellar Activity on X-Ray and Ultraviolet Transits", The Astrophysical Journal, Mar. 20, 2015, vol. 802: 41, 10 pgs.
Maillard, "Signal-to-noise ratio and astronomical fourier transform spectroscopy", International Astronimical Union, G. Cayrel de Strobel and M. Spite (eds.), The Impact of Very High SIN Spectroscopy on Stellar Physics, 1988, pp. 71-78.
Menager et al., "Calculation of the H Lyman alpha emission of the hot Jupiters HD 209458b and HD 189733b", Icarus, Mar. 13, 2013, vol. 226, pp. 1709-1718.
Mierkiewicz et al., "Detection of Diffuse Interstellar [O II] Emission from the Milky Way Using Spatial Heterodyne Spectroscopy", The Astrophysical Journal, Oct. 10, 2006, vol. 650, No. 1, pp. L63-L66.
Mierkiewicz et al., "First light performance of a near UV spatial heterodyne spectrometer for interstellar emission line studies", Proceedings of SPIE vol. 5492, Ground-based Instrumentation for Astronomy, Sep. 30, 2004, pp. 751-766.

(56) References Cited

OTHER PUBLICATIONS

Milster et al., "Coherence and Fringe Localization", 2006, Chapter 5, pp. 41-63.
Milster et al., "Coherence and Fringe Localization", 2006, Chapter 5, pp. 9-46.
Mordasini et al., "Characterization of exoplanets from their formation. II. The planetary mass-radius relationship", Astronomy & Astrophysics, Aug. 26, 2012, vol. 547:A112, 36 pgs.
Mumma et al., "Strong release of methane on Mars in northern summer 2003", Science, Feb. 20, 2009, vol. 323, No. 5917, pp. 1041-1045.
Nathaniel, "Spatial Heterodyne Raman Spectroscopy", Submitted for the Degree of Doctor of Philosophy from the University of Surrey, Sep. 2011, 175 pgs.
Nathaniel et al., "A Compact Spatial Heterodyne Remote Raman Spectrometer for Mars Exploration", 62nd International Astronautical Congress 2011, Space Exploration Symposium (A3), Mars Exploration—Part 2 (3B), 1 pg.
Nathaniel et al., "Spatial Heterodyne Raman Spectroscopy", 42nd Lunar and Planetary Science Conference, 2011, 2 pgs.
Nichols et al., "Hubble space telescope observations of the nuv transit of wasp-12b", The Astrophysical Journal, Apr. 10, 2015, vol. 803: 9, 5 pgs.
Nikzad et al., "Delta-doped electron-multiplied CCD with absolute quantum efficiency over 50% in the near to far ultraviolet range for single photon counting applications", Applied Optics, Jan. 20, 2012, vol. 51, No. 3, pp. 365-369.
Orsel et al., "Heterodyne interferometric polarization coherent anti-Stokes Raman scattering (HIP-CARS) spectroscopy", Journal of Raman Spectroscopy, Feb. 25, 2010, vol. 41, pp. 1678-1681.
Oshagh et al., "Effect of stellar activity on the high precision transit light curve", EPJ Web of Conferences, 2015, vol. 101, 05003, 5 pgs.
Owen et al., "Magnetically controlled mass-loss from extrasolar planets in close orbits", Monthly Notices of the Royal Astronomical Society, Jul. 9, 2014, vol. 444, pp. 3761-3779.
Pepe et al., "Instrumentation for the detection and characterization of exoplanets", Nature, Sep. 18, 2014, vol. 513, No. 7518, pp. 358-366.
Perkins, "Spatial Heterodyne Spectroscopy: Modeling and Interferogram Processing", Thesis, Rochester Institute of Technology, Jul. 29, 2013, 134 pgs.
Perkins et al., "Spatial heterodyne spectrometer: modeling and interferogram processing for calibrated spectral radiance measurements", Proc. of SPIE, vol. 8870, Sep. 23, 2013, 88700R, doi: 10.1117/12.2023765, 14 pgs.
Pont et al., "Detection of atmospheric haze on an extrasolar planet: the 0.55-1.05 μm transmission spectrum of HD 189733b with the HubbleSpaceTelescope", Monthly Notices of the Royal Astronomical Society, 2008, vol. 385, No. 1, pp. 109-118.
Pont et al., "The prevalence of dust on the exoplanet HD 189733b from Hubble and Spitzer observations", Monthly Notices of the Royal Astronomical Society, May 1, 2013, vol. 432, pp. 2917-2944.
Pryor et al., "The Galileo and Pioneer Venus ultraviolet spectrometer experiments—Solar Lyman-alpha latitude variation at solar maximum from interplanetary Lyman-alpha observations", The Astrophysical Journal, Jul. 20, 1992, vol. 394, pp. 363-377.
Reynolds et al., "The Wisconsin H-Alpha Mapper (WHAM): A Brief Review of Performance Characteristics and Early Scientific Results", Publications of the Astronomical Society of Australia, 1998, vol. 15, pp. 14-18.
Ribak et al., "Revealing bio-lines of exoplanets by Fourier spectroscopy", Proc. of SPIE vol. 9146, Jul. 24, 2014, doi: 10.1117/12.2057372, 7 pgs.
Roesler et al., "An Overview of Spatial Heterodyne Spectroscopy", University of Wisconsin, 20 pgs.
Roesler, "An Overview of the SHS Technique and Applications", Optical Society of America, OSA Technical Digest Series, Fourier Transform Spectroscopy/ Hyperspectral Imaging and Sounding of the Environment, Feb. 11-15, 2007, 3 pgs.
Roesler et al., "Far-Ultraviolet Imaging Spectroscopy of Io's Atmosphere with HST/STIS", Science, Jan. 15, 1991, vol. 283, pp. 353-357.
Roesler et al., "Spatial Heterodyne Spectroscopy for Atmospheric Remote Sensing", SPIE Conference on Optical Spectroscopic Techniques and Instrumentation for Atmospheric and Space Research III, Denver, Colorado, Jul. 1999, SPIE vol. 3756, pp. 337-345.
Roesler et al., "Spatial Heterodyne Spectroscopy: An Emerging Technology for Interference Spectroscopy", Hubble's Science Legacy: Future Optical-Ultraviolet Astronomy from Space, ASP Conference Series, 2003, vol. 291, pp. 395-398.
Roesler et al., "Spatial Heterodyne Spectroscopy: Interferometric Performance at any Wavelength Without Scanning", SPIE vol. 1318, Optical Spectroscopic Instrumentation and Techniques for the 1990s, Dec. 1, 1990, pp. 234-243.
Rogerson et al., "Spectrophotometric Results from the Copernicus Satellite. I. Instrumentation and Performance", The Astrophysical Journal, May 1, 1973, vol. 181, pp. L97-L102.
International Search Report and Written Opinion for International Application No. PCT/US2017/060473, Search completed Feb. 12, 2018, dated Feb. 13, 2018, 7 Pgs.
"A Monolithic, Non-Field-Widened Spatial Heterodyne Spectrometer for Solar System Exploration, Phase 1 Project", NASA, SBIR/STTR Programs, Space Technology Mission Directorate (STMD), Project Completed 2005, TechPort, Oct. 1, 2012, 3 pgs.
"Earth Science and Applications from Space: A Midterm Assessment of NASA's Implementation of the Decadal Survey", Committee on the Assessment of NASA's Earth Science Program; Space Studies Board; Division on Engineering and Physical Sciences; National Research Council, 2012, 124 pgs.
"Panel Reports—New Worlds, New Horizons in Astronomy and Astrophysics", Science Frontiers Panels; Program Prioritization Panels; Committee for a Decadal Survey of Astronomy and Astrophysics; National Research Council, 2010, 579 pgs., (presented in four parts).
"Science Payload", European Space Agency, Juice, Mar. 7, 2013, http://sci.esa.int/juice/50073-science-payload/, 3 pgs.
"Vision and Voyagers for Planetary Science in the Decade 2013-2022", Committee on the Planetary Science Decadal Survey; Space Studies Board Division on Engineering and Physical Sciences; National Research Council, 2011, 398 pgs., (presented in two parts).
"Vision and voyages for planetary science in the decade 2013-2022", The National Academy of Sciences, Space Studies Board, Mar. 2011, 2 pgs.
A'Hearn et al., "Emission by OD in comets", The Astrophysical Journal, Oct. 15, 1985, vol. 297, pp. 826-836.
Adamovsky et al., "Detection, Evaluation, and Optimization of Optical Signals Generated by Fiber Optic Bragg Gratings Under Dynamic Excitations", NASA/TM—2002-211565, Aug. 2002, 17 pgs.
Adams et al., "High-resolution observations of the Lyman alpha sky background", The Astrophysical Journal, Feb. 15, 1977, vol. 212, pp. 300-308.
Alexander et al., "The provenances of asteroids, and their contributions to the volatile inventories of the terrestrial planets", Science, Aug. 10, 2012, vol. 337, pp. 721-723.
Altwegg et al., "67p/churyumov-gerasimenko, a Jupiter family comet with a high d/h ratio", Science, Jan. 23, 2015, vol. 347, No. 6220, 7 pgs.
Angel et al., "A Miniature Spatial Heterodyne UV Raman Spectrometer for Planetary Exploration: Proof of Principle for Smallsat Standoff Operations Using a Cell-Phone Detector", Lunar and Planetary Science XLVIII, 2017, 2 pgs.
Angel et al., "Standoff Detection using a Spatial Heterodyne Raman Spectrometer", Dept. of Chemistry & Biochemistry The University of South Carolina, Aug. 21, 2014, 29 pgs.
Banaszkiewicz et al., "Determination of interstellar helium parameters from the Ulysses-Neutral Gas experiment: Method of data analysis", Astronomy & Astrophysics Supplement Series, Apr. 24, 1996, vol. 120, pp. 587-602.
Barnett et al., "Improving Spectral Results Using Row-by-Row Fourier Transform of Spatial Heterodyne Raman Spectrometer

(56) References Cited

OTHER PUBLICATIONS

Interferogram", Applied Spectroscopy, Oct. 21, 2016, vol. 71, No. 6, doi: 10.1177/0003702816681013, pp. 1380-1386.

Barnett et al., "Standoff Laser-Induced Breakdown Spectroscopy (LIBS) Using a Miniature Wide Field of View Spatial Heterodyne Spectrometer with Sub-Microsteradian Collection Optics", Applied Spectroscopy, Apr. 6, 2016, vol. 71, No. 4, 2017, pp. 583-590.

Barthelemy et al., "Sensitivity of upper atmospheric emissions calculations to solar/stellar UV flux", Journal of Space Weather and Space Climate, Oct. 20, 2014, vol. 4, A35, 8 pgs.

Beaty et al., "Candidate Scientific Objectives for the Human Exploration of Mars, and Implications for the Identification of Martian Exploration Zones", Scientific Objectives for the Human Exploration of Mars Science Analysis Group (MEPAG HSO-SAG), Jul. 24, 2015, 38 pgs.

Beauge et al., "Emerging Trends in a Period-Radius Distribution of Close-in Planets", The Astrophysical Journal, Jan. 20, 2013, vol. 763, 7 pgs.

Ben-Jaffel et al., "Transit of Exomoon Plasma Tori: New Diagnosis", The Astrophysical Journal, Apr. 3, 2014, 7 pgs.

Ben-Jaffel et al., "On the existence of energetic atoms in the upper atmosphere of exoplanet HD209458b", The Astrophysical Journal, Feb. 1, 2010, vol. 709, pp. 1284-1296.

Bershady, "3D Spectroscopic Instrumentation", arXiv:0910.0167, Oct. 1, 2009, 53 pgs.

Bertaux et al., "Interstellar medium in the vicinity of the sun—A temperature measurement obtained with Mars-7 interplanetary probe", Astronomy & Astrophysics, 1976, vol. 46, pp. 19-29.

Bertaux et al., "Characteristics of the Local Interstellar Hydrogen determined from PROGNOZ 5 and 6 interplanetary Lyman alpha line profile measurement with a hydrogen absorption cell", Astronomy & Astrophysics, Mar. 21, 1985, vol. 150, pp. 1-20.

Bertaux et al., "Evidence for a Source of an Extraterrestrial Hydrogen Lymanalpha Emission", Astronomy & Astrophysics, 1971, vol. 11, pp. 200-217.

Bertaux et al., "Monitoring solar activity on the far side of the sun from sky Yeflected Lyman $\alpha$ radiation", Geophysical Research Letters, May 1, 2000, vol. 27, No. 9, pp. 1331-1334.

Bertin et al., "Detection of the local interstellar cloud from high-resolution spectroscopy of nearby stars: Inferences on the heliospheric interface", Journal of Geophysical Research, Sep. 1, 1993, vol. 98, No. A9, pp. 15,193-15,197.

Betremieux et al., "Description and ray-tracing simulations of HYPE: a far-ultraviolet polarimetric spatial-heterodyne spectrometer", Proc. of SPIE vol. 7732, Jul. 29, 2010, 12 pgs.

Bieler et al., "Abundant molecular oxygen in the coma of comet 67P/Churyumov—Gerasimenko", Nature, Oct. 29, 2015, vol. 526, pp. 678-681.

Bingham, "Grating spectrometers and spectrographs re-examined", Quarterly Journal of the Royal Astronomical Society, May 18, 1979, vol. 20, pp. 395-421.

Bishop et al., "Analysis of Balmer a intensity measurements near solar minimum", Journal of Atmospheric and Solar-Terrestrial Physics, Apr. 3, 2000, vol. 63, 2001, pp. 341-353.

Biver et al., "Chemical Composition Diversity Among 24 Comets Observed At Radio Wavelengths", Earth, Moon, and Planets, May 19, 2002, vol. 90, No. 1, pp. 323-333.

Blasberg et al., "Interference of Scattering Pathways in Raman Heterodyne Spectroscopy of Multilevel Atoms", Physical Review B, May 1, 1995, vol. 51, 12439, 1 pg.

Bockelee-Morvan et al., "The Composition of Cometary Volatiles", Comets II, 2005, pp. 391-423.

Bourrier et al., "Atmospheric escape from HD 189733b observed in HI Lyman-a: detailed analysis of HST/STIS Sep. 2011 observations", Astronomy and Astrophysics, Jan. 9, 2013, vol. 551: A63, 11 pgs.

Bourrier et al., "Radiative braking in the extended exosphere of GJ 436 b", Astronomy and Astrophysics, Aug. 20, 2015, vol. 582, 9 pgs.

Brandt et al., "Interplanetary Gas. I. Hydrogen Radiation in the Night Sky", The Astrophysical Journal, 1959. vol. 130, pp. 670-682.

Breckinridge, "Coherence interferometer and astronomical applications", Applied Optics, Dec. 1972, vol. 11, pp. 2996-2998.

Broadfoot et al., "Self-scanned anode array with a microchannel plate electron multiplier—The SSANACON", Applied Optics, Jun. 1977, vol. 16, No. 6, pp. 1533-1538.

Broadfoot et al., "The interstellar wind—Mariner 10 measurements of hydrogen (1216 A) and helium (584 A) interplanetary emission", The Astrophysical Journal, Jun. 15, 1978, vol. 222, pp. 1054-1067.

Burrows, "Highlights in the study of exoplanet atomospheres", Nature, Sep. 18, 2014, vol. 513, pp. 345-352.

Burrows et al., "Astronomical questions of origins and survival", Nature, Nov. 23, 1995, vol. 378, pp. 333.

Cai et al., "Optical simulation of large aperture spatial heterodyne imaging spectrometer", Optics Communications, Available online Dec. 28, 2015, vol. 366, 2016, pp. 136-141.

Betremieuxa et al., "Description and ray-tracing simulations of HYPE, a far-ultraviolet polarimetric spatial-heterodyne spectrometer", Proc. of SPIE vol. 7732, Jul. 2010, 12 pgs.

Englert, et al., "The Michelson Interferometer for Global High-resolution Thermospheric Imaging (MIGHTI): Wind and Temperature Observations from the Ionospheric Connection Explorer (ICON)", Imaging and Applied Optics, OSA Technical Digest, Optical Society of America, 2013, paper FW1D.3, 3 pgs., https://doi.org/10.1364/FTS.2013.FW1D.3.

Englert et al., "Michelson Interferometer for Global High-Resolution Thermospheric Imaging (MIGHTI): Instrument Design and Calibration", Space Science Reviews, Oct. 2017, vol. 212, No. 1-2, pp. 553-584, doi: 10.1007/s11214-017-0358-4.

Stephan et al., "Interplanetary H Lya Observations from a Sounding Rocket", The Astrophysical Journal, Sep. 20, 2001, vol. 559, pp. 491-500.

\* cited by examiner

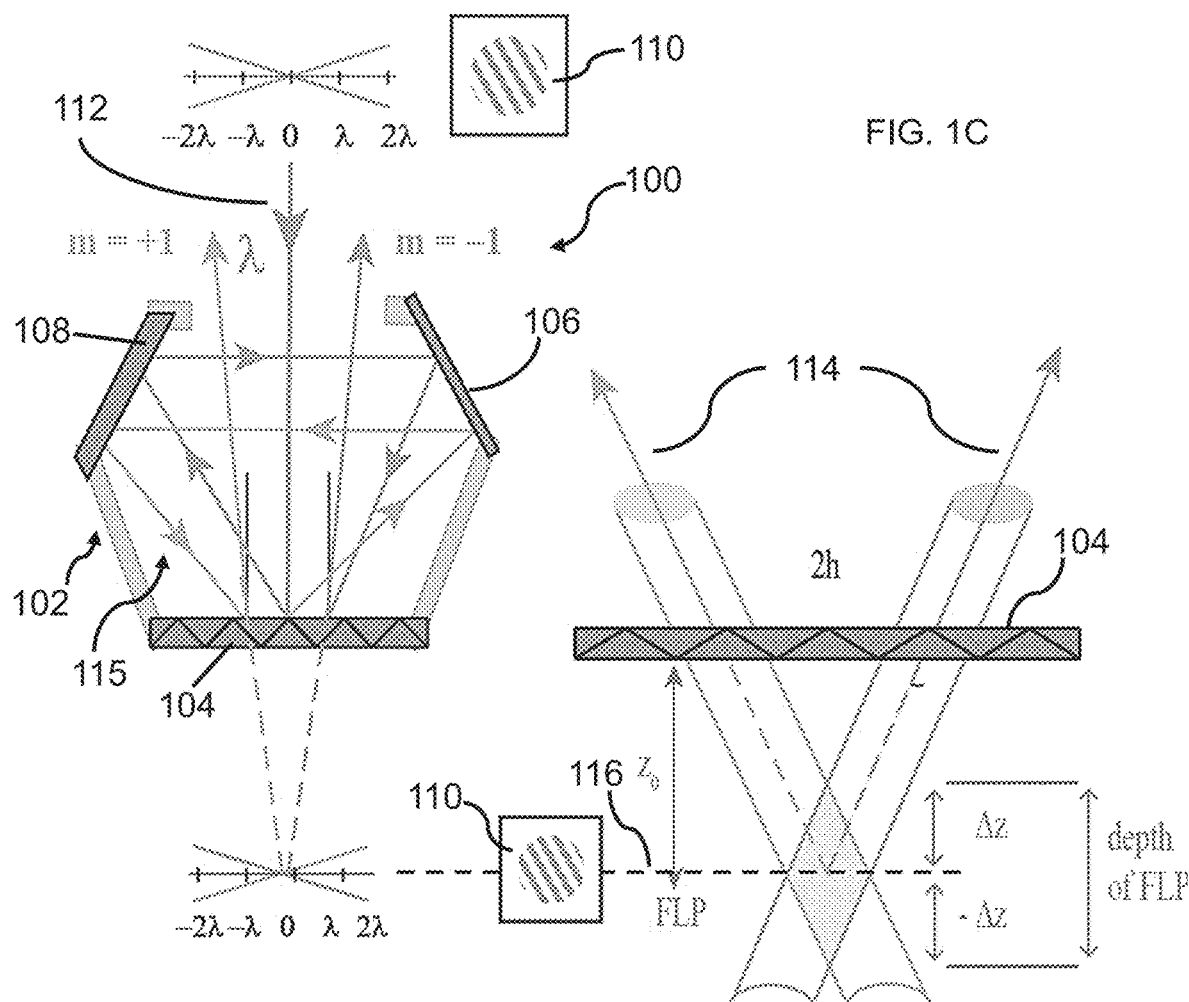
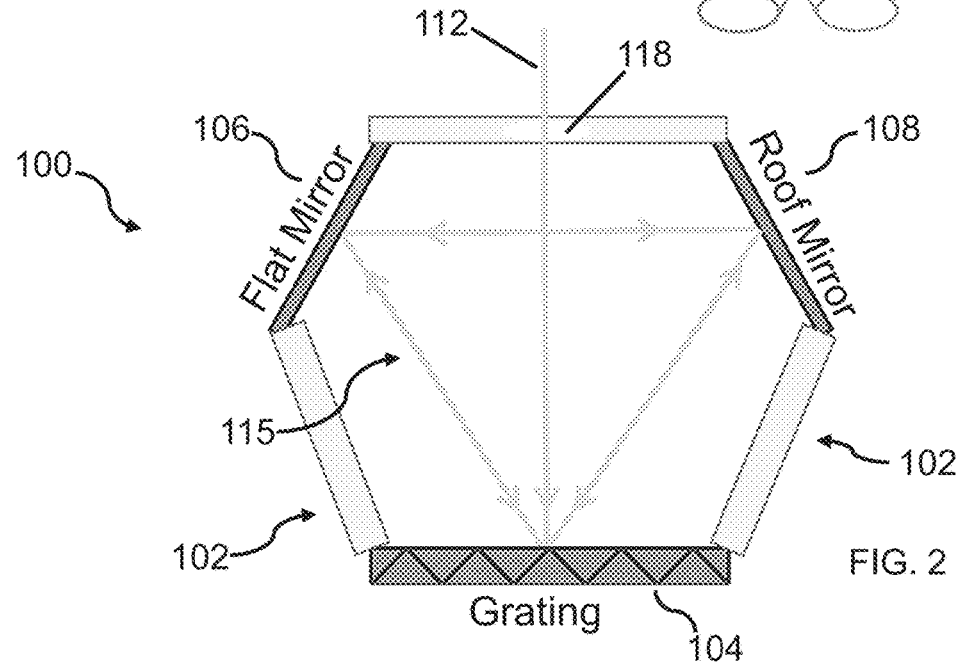
FIG. 1C
FIG. 2

FIG. 3A
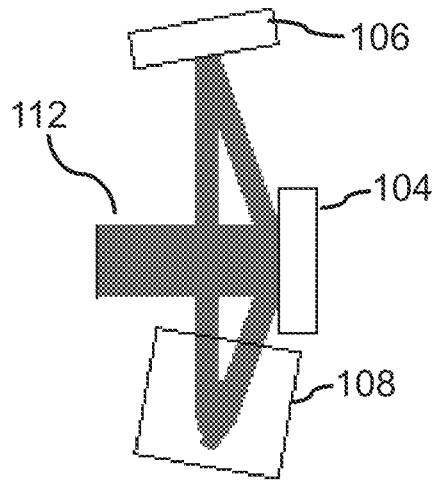
FIG. 3B
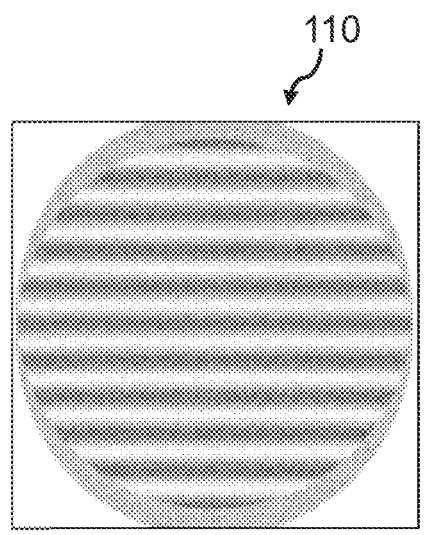
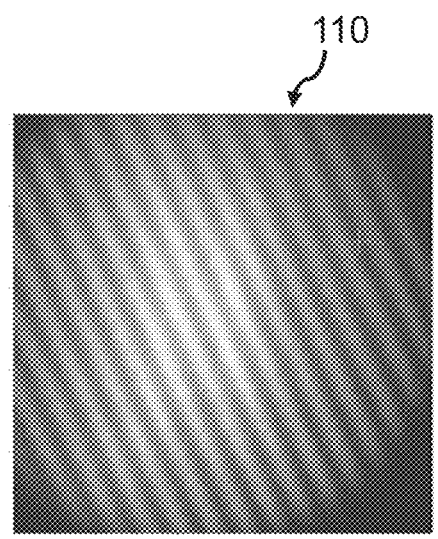
FIG. 3C

FIG. 5
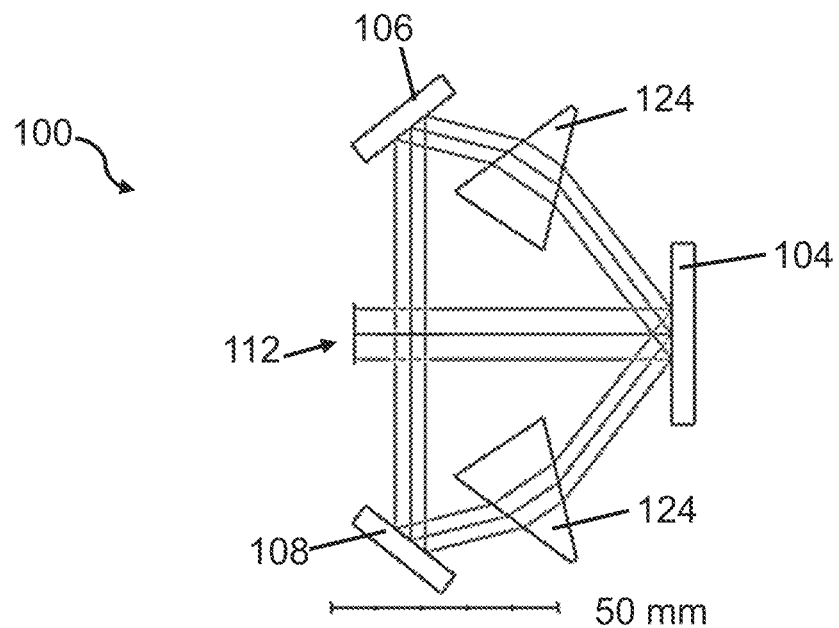
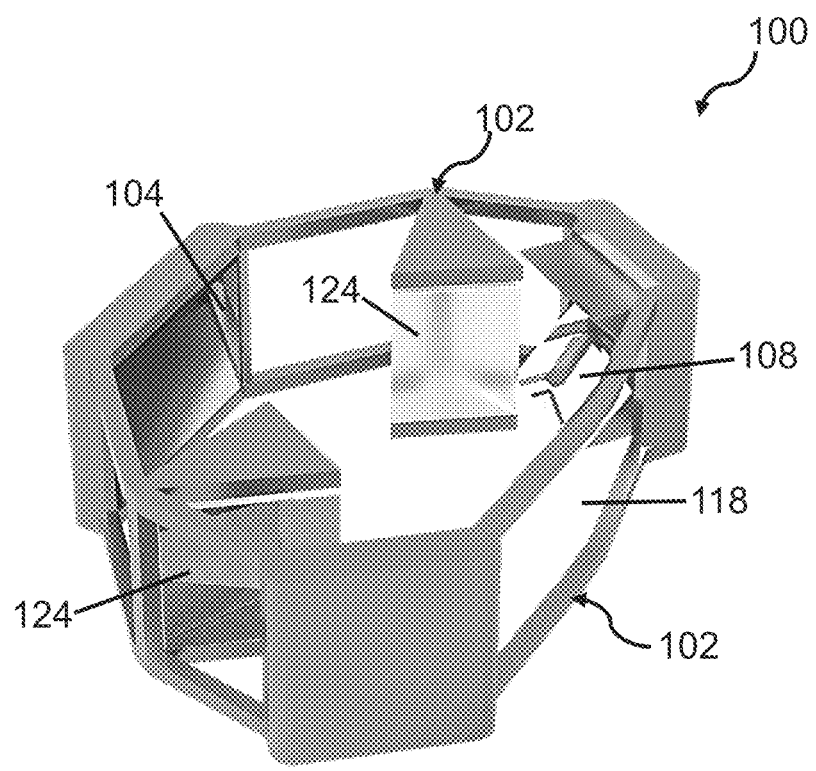
FIG. 6

MONOLITHIC ASSEMBLY OF REFLECTIVE SPATIAL HETERODYNE SPECTROMETER

CROSS-REFERENCE TO RELATED APPLICATIONS

The current application claims priority to U.S. Provisional Patent Application No. 62/418,578, filed Nov. 7, 2016, U.S. Provisional Patent Application No. 62/418,640, also filed Nov. 7, 2016, and U.S. Provisional Patent Application No. 62/465,036, filed Feb. 28, 2017, the disclosures of which are incorporated herein by reference.

STATEMENT OF FEDERAL FUNDING

The invention described herein was made in performance of work under a NASA contract NNN12AA01C, and is subject to the provisions of Public Law 99-517 (35 USC 202) in which the Contractor has elected to retain title.

FIELD OF THE INVENTION

The present disclosure is directed to interference spectrometers; and more particularly to reflective spatial heterodyne spectrometers.

BACKGROUND OF THE INVENTION

Observing the intensity and line profile of emission and absorption lines is a stable technique for a widespread variety of applications, such as the study of astronomical targets. Atomic, molecular, and ion transitions in emission or absorption spectra reveal important information about composition, isotopic ratios, temperature, velocity and the amount of energy entering or leaving a system. Low-resolution spectroscopy allow the study of basic parameters like composition, distribution, intensity, and energy distribution. In contrast, high-resolution spectroscopy can reveal additional information about the physical characteristics of a source such as velocity, temperature, pressure, isotopic signatures, etc.

High-resolution spectroscopy carries more information than low-resolution spectroscopy, yet the cost of the added information must be balanced against other restrictive factors. In the solar system, diagnostic emission line sources are typically faint, buried under the reflected continuum of the Sun and angularly extended from a remote sensing perspective, making their angular size often exceed the field of view (FOV) of the instrument being used to observe it. The measured Doppler shifts are typically ≤50 km/sec and temperatures rarely exceed 1000 K. The solar continuum intensity drops rapidly for $\lambda<4000$ Å while the emission lines below 1500 Å completely dominate the Sun's spectrum. Atomic, ion, and molecular fluorescence, metastable emitters, and collisional stimulated emissions dominate the observable signatures in visible and extreme UV (EUV) regions. The faintness and angular extent of many of these target emissions and the volume limitations of remote probes and small spacecraft restrict the opportunities for incorporating a high spectral resolution capability and requires a need for high-throughput, compact—for space probe applications as well as field commercial applications—and high resolution spectral sensors.

Astronomical targets cover a vast range of sizes and environments that present a challenge to spectroscopic observers. Current spectroscopic techniques fall short in addressing high resolving power (R) observations at wide FOV and high throughput. Most existing conventional instrumental designs lose their sensitivity by going to wider FOVs. This type of sensitivity trade-off presents fewer challenges for point sources or for very small sources but it restricts the spectroscopic investigation of the extended sources. For example the velocity of a galaxy that is moving with the relative velocity of 600 km/sec can be detected with an instrument with an R of ~500. By contrast, the velocity distributions in comets cover a range of 1-100 km/s, which requires R up to 100,000 to detect the corresponding Doppler shift.

Unfortunately, high R instruments currently in use are not optimized to achieve high R at wide FOV. The most used high R instrument is the classical grating spectrometer that has about R~15,000 at many ground based telescopes, an R that is relatively low for extended and low energy astronomical and planetary science targets. The spectrometers that have the capability of R>30,000 are physically very large and coupled to large aperture telescopes to overcome the small angular size of the apertures, which in turn drastically limits their allocation time for temporal observations.

Interferometers—for instance, Fourier Transform Spectrometers (FTS) or Fabry-Perot Interferometers—offer significant advantages over grating spectrometers due to their higher étendue and smaller overall physical size at the same R. However, they tend to have increasingly challenging optical tolerance issues at visible and shorter UC wavelengths. In the vacuum UV, especially below 1600 Å, the number of transmitting crystals is sharply reduced to a trio of fluoride crystals. Therefore, reflective designs, where limitations are mainly subject to the mirror coating, have emerged as a more efficient way to gain access to a broader spectral range.

Though reflective spatial heterodyne spectrometer (RSHS) technology does offer some promising advantages over the aforementioned interferometers, RSHS instruments have shortcomings of their own. The size, assembly structure, and design of conventional RSHS systems are major weaknesses that inhibit the development of RSHS for widespread applications in the science, medical, commercial, or military sector due to their volume, mass, and alignment tolerances. Accordingly, a need exists to develop improved RSHS assembly designs to better utilize the technology's potential.

SUMMARY OF THE INVENTION

The present disclosure provides, in accordance with the current invention, embodiments of monolithic cyclical reflective spatial heterodyne spectrometers (CRSHS).

In some embodiments, the invention is directed to a monolithic CRSHS comprising:
- a symmetric grating, said symmetric grating being configured to split an incoming beam of light, having a wavelength $\lambda$, into two diffracted beams traveling in different, angularly offset directions;
- a flat mirror, disposed at a first angle in relation to the symmetric grating; and
- a roof mirror, disposed at a second angle in relation to the symmetric grating;
    - wherein the flat mirror and the roof mirror are disposed such that said flat mirror and said roof mirror reflect the diffracted beams in a cyclical common-path configuration such that said diffracted beams diffract again off the symmetric grating to produce a localized fringe pattern; and wherein the flat mirror, the roof mirror, and the symmetric grating are disposed to satisfy a heterodyne condition at all times, said heterodyne condition being satisfied when there exists a heterodyne wavelength $\lambda_0$ where the two diffracted beams exit the reflective spatial heterodyne spectrometer in normal angle and do not produce a localized fringe pattern; and a supporting structure, wherein the symmetric grating, flat mirror, and roof mirror are each directly and securely affixed to said supporting structure.

In some such embodiments, the supporting structure is a body with a defined internal volume, and wherein the symmetric grating, the flat mirror, and the roof mirror are affixed to at least one internal wall of said body within said internal volume.

In other such embodiments, said body has at least one opening disposed such that the incoming beam of light enters through the opening and hits the symmetric grating at normal incidence.

In still other embodiments, the body has at least two internal walls.

In yet other embodiments, the roof mirror and the flat mirror are separated by a distance of no more than 70 cm.

In still yet other embodiments, the roof mirror and the flat mirror are separated by a distance of no more than 25 cm.

In some such embodiments, the roof mirror and the flat mirror are separated by a distance of no more than 10 cm.

In other such embodiments, the flat mirror, the roof mirror, and the symmetric grating are affixed to the supporting structure by an adhesive substance.

In still other embodiments, the supporting structure is made from BK7 glass or fused silica.

In yet other embodiments, the incoming beam of light travels through at least one optical fiber before being diffracted by the symmetric grating.

In still yet other embodiments, the at least one optical fiber transmits light from a telescope or a microscope.

In some such embodiments, said telescope is a Newtonian telescope or a Cassegrain telescope.

In other embodiments, the invention is directed to a field-widened monolithic CRSHS comprising:
  a symmetric grating, said symmetric grating being configured to split an incoming beam of light, having a wavelength $\lambda$, into two diffracted beams traveling in different, angularly offset directions;
  a flat mirror, disposed at a first angle in relation to the symmetric grating;
  a roof mirror, disposed at a second angle in relation to the symmetric grating; and
  at least one optical element;
    wherein the flat mirror and the roof mirror are disposed such that said flat mirror and said roof mirror reflect the diffracted beams in a cyclical common-path configuration such that said diffracted beams diffract again off the symmetric grating to produce a localized fringe pattern;
    wherein the flat mirror, the roof mirror, the symmetric grating, and the at least one optical element are disposed to satisfy a heterodyne condition at all times, said heterodyne condition being satisfied when there exists a heterodyne wavelength $\lambda_0$ where the two diffracted beams exit the reflective spatial heterodyne spectrometer in normal angle and do not produce a localized fringe pattern; and wherein the at least one optical element increases throughput and widens field of view while maintaining a fringe localization plane; and
  a supporting structure, wherein the symmetric grating, flat mirror, roof mirror, and the at least one optical element are each directly and securely affixed to said supporting structure.

In some such embodiments, the supporting structure is a body with a defined internal volume, and wherein the symmetric grating, the flat mirror, the roof mirror, and the at least one optical element are affixed to at least one internal wall of said body within said internal volume.

In other such embodiments, said body has at least one opening disposed such that the incoming beam of light enters through the opening and hits the symmetric grating at normal incidence.

In still other embodiments, the body has at least two internal walls.

In yet other embodiments, the roof mirror and the flat mirror are separated by a distance of no more than 70 cm.

In still yet other embodiments, the roof mirror and the flat mirror are separated by a distance of no more than 25 cm.

In some such embodiments, the roof mirror and the flat mirror are separated by a distance of no more than 10 cm.

In other such embodiments, the flat mirror, the roof mirror, the symmetric grating, and the at least one optical element are affixed to the supporting structure by an adhesive substance.

In still other embodiments, the supporting structure is made from BK7 glass or fused silica.

In yet other embodiments, the incoming beam of light travels through at least one optical fiber before being diffracted by the symmetric grating.

In still yet other embodiments, the at least one optical fiber transmits light from a telescope or a microscope.

In some such embodiments, said telescope is a Newtonian telescope or a Cassegrain telescope.

In other such embodiments, the at least one optical element is selected from the group consisting of a prism, lens, mirror, or transmission grating.

In still other embodiments, the at least one optical element comprises two wedge prisms.

BRIEF DESCRIPTION OF THE DRAWINGS

The description will be more fully understood with reference to the following figures and data, which are presented as exemplary embodiments of the disclosure and should not be construed as a complete recitation of the scope of the invention, wherein:

FIGS. 1A-1C provide schematic diagrams of a monolithic CRSHS configuration. FIG. 1A shows the beam path at the heterodyne wavelength (no fringe pattern), and FIG. 1B provides a top view of the beam path schematic. FIG. 1C shows the beam path at other wavelengths, further showing the fringe localization plane in relation to the symmetric grating and diffraction beams in addition to the fringe pattern that is produced.

FIG. 2 provides another schematic diagram of a monolithic CRSHS configuration in accordance with some embodiments of the current invention, where the supporting structure has an opening disposed such that the incoming beam of light enters through the opening and hits the symmetric grating at normal incidence.

FIG. 3A provides an image of a simulated ZEMAX raytracing model for an embodiment of the invention, where the angles are set for the wavelength 589 nm.

FIG. 3B provides an image of a simulated fringe pattern from a Na hollow cathode lamp (Na D wavelength) resulting from the model in FIG. 3A.

FIG. 3C provides an image of the produced fringe pattern from a Na hollow cathode lamp (Na D wavelength) resulting from the embodiment of the invention in FIG. 3A (simulated in FIGS. 3B and 3C).

FIG. 5 provides a schematic diagram of a field-widened monolithic CRSHS in accordance with an embodiment of the current invention.

FIG. 6 provides an image of a field-widened monolithic CRSHS in accordance with an exemplary embodiment of the current invention.

DETAILED DESCRIPTION OF THE INVENTION

Turning to the drawings, monolithic CRSHS spectrometers, their methods of use, and methods of their manufacture are provided. In various embodiments, the monolithic CRSHS assemblies maintain a heterodyne condition such that for the heterodyne wavelength, or tuned wavelength, there is no data in form of fringes. However, for wavelengths within the bandpass range, but other than the heterodyne wavelength, visible localized fringe patterns may be produced. In some such embodiments, the gratings within the spectrometer may be holographic, symmetric, non-blazed, sinusoidal or triangular. In some other embodiments, the monolithic CRSHS spectrometers may incorporate field-widening elements, such as, for example, two wedge prisms; other optical elements, such as mirrors, transmission gratings, or lenses, may also be used. In still other embodiments, the monolithic CRSHS may incorporate a coupled optical fiber system.

Technical Concept for SHS and CRSHS

The original SHS configuration is a Michelson design SHS (MSHS) in a Michelson interferometer configuration where the mirror in each interferometer arm was replaced by a grating. The MSHS design eventually led to a series of ground and space-based instruments for observations of atmospheric and interstellar emission line features, and the majority of SHS projects and analysis in the known art are still in the MSHS format. A weakness of MSHS instruments is their non-common path design for the two arms and the use of transmitting elements, which limits their usefulness in shorter wavelengths (such as UV).

The conventional RSHS known in the art, however, is an all-reflective two-beam cyclical interferometer that can observe targeted atomic and molecular gas spectral lines at high spectral resolution. It comprises a grating and reflective optics—a flat mirror and a roof mirror—tailored to a target wavelength region (UV to IR) with a solid-state array detector that produces optical interference fringes (wavenumber-dependent 2-D Fizeau fringe patterns), whose Fourier transform produces high-resolution spectra. With its high optical throughput (étendue) and wide field of view (FOV), it has high sensitivity to weak or diffuse sources such as comet coma and Earth atmosphere gases. RSHS has the benefit of higher optomechanical tolerance and simpler optomechanical design, and cyclical RSHS (CRSHS) uses a common path configuration which is more stable against thermo-mechanical effects. Off-axis telescopes, designed to try to avoid obstructing the incoming light, or siderostats are often preferred for coupling with CRSHS.

Figure 1A:
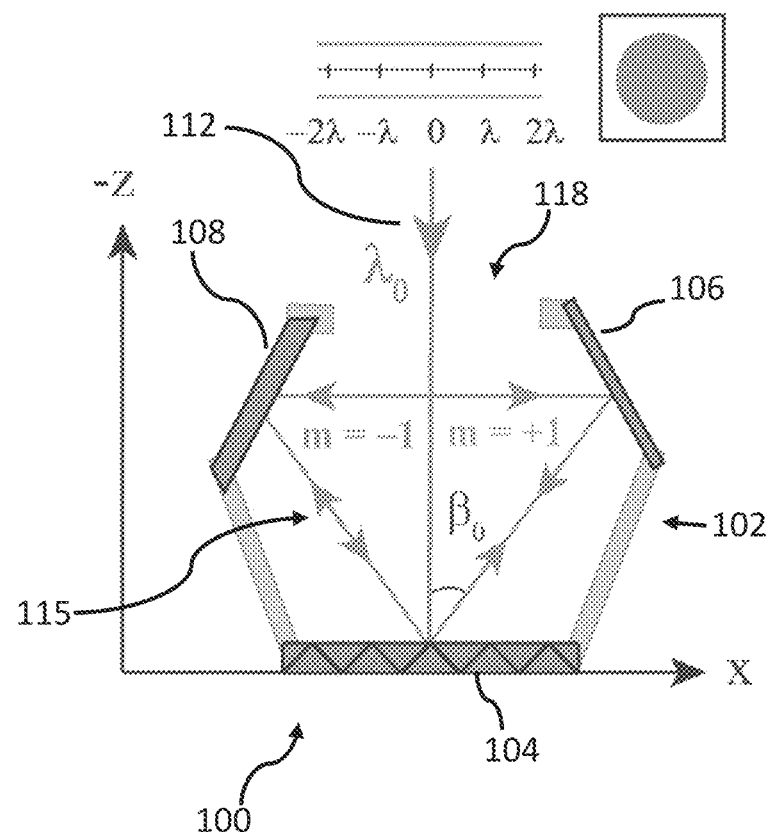
Figure 1B:
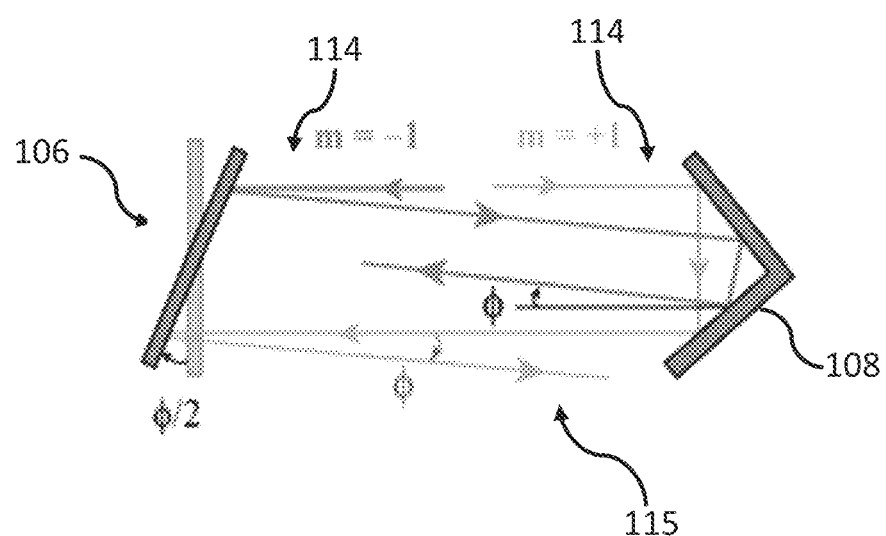

Unlike MSHS designs, where a beam splitter is needed for the incoming light, for CRSHS designs, a beam splitter is not necessary because, as illustrated in FIGS. 1 and 2, the grating 104 itself diffracts an incoming collimated beam 112 into ±m orders following the grating equation for normal incidence [sin $\beta_{in}$+sin $\beta_{out}$] cos $\Phi$=m$\lambda$G where $\lambda$ is the wavelength, $\beta_{in}$ and $\beta_{out}$ are the incoming and outgoing angles, $\phi$ is the angle between the incoming beams relative to the grating normal perpendicular to the diffraction plane, and G is the groove density. The incoming light beam 112 hits the grating 104 in the normal incidence and splits to two anti-symmetrical diffraction orders (m=±1) 114. Both orders traverse the optical path 115 with opposite angular alignment, converge back on the grating 104, and diffract for the second time before exiting the system. By using a right angle 'roof' mirror 108 for one of the mirrors, the incoming and outgoing beams are separated into parallel planes below (or above) the incoming optical path. For the tuned wavelength $\lambda_0$ called the heterodyne wavelength, the optics are aligned in such a way to have both orders 114 exit the grating 104 in normal angle: their wave-fronts exit parallel in respect to each other and hence create no fringes, as illustrated in FIG. 1A. This case is referred to as the 'heterodyne condition'. At all other wavelengths ($\lambda$=$\lambda_0$+$\Delta\lambda$), there is a dispersive rotation introduced to the merging wave-fronts that results in the formation of 2-D Fizeau fringes 110 (as illustrated in FIG. 1C) with a frequency dependent on $\Delta\lambda$. FIG. 1B provides a top view of the beam path and the parallel planes.

As illustrated in FIG. 1C, the data fringe pattern 110 forms at a location called the Fringe Localization Plane (FLP) 116 and is imaged onto a 2-D imaging detector. FLP 116 is defined by following the diverging exiting beams 114 from the interferometer (monolithic CRSHS 100) and is a virtual plane located at distance $z_0$ behind the grating 104 on the z-axis. The FLP 116 is where the imaging detector presumes the exiting beams 114 are intersecting, and the depth of FLP focus is the distance that the imaging detector can image while maintaining an acceptable fringe contrast.

In the small angle approximation, the FLP 116 position can be estimated as:

$$z_0 \approx \frac{L}{2\cos^2\beta_0}$$

where L is the average optical path inside the CRSHS and $\beta_0$ (shown in FIG. 1A) is the first diffraction angle for the heterodyne wavelength (to which the CRSHS is tuned). In the small angle approximation, the recorded interference pattern on the detector at wavelength $\sigma=1/\lambda$ from the two $m=\pm 1$ orders is defined as:

$$I(x,y,z_0,\sigma)=\int_{\sigma_1}^{\sigma}I(\sigma)d\sigma[1+\cos(2\pi(f_x x+f_y y+f_z z_0))]$$

$$f_x \approx 4\delta\sigma \sin \beta_0$$

$$f_y \approx 2\sigma\phi$$

$$f_z \approx 2\sigma\sqrt{1-4\sin\beta_0^2(\delta\sigma/\sigma)^2}$$

Where $I(\sigma)$ is the spectral intensity of the input light, $\phi$ is the cross angle between the interferometer mirror and the diffraction plane, and a defines the bandpass boundary. The two-dimensional Fourier transform of $I(x, y, z_0, \sigma)$ recovers the original power spectrum in units of $\Delta\lambda$. Alignment of CRSHS involves the rotation of one or both of the transfer mirrors (106 and 108) to set the angles such that a chosen wavelength satisfies the heterodyne condition ($\lambda_0$).

High-resolution spectrometers are mainly grating spectrometers with small field of view in which the sensitivity and the spectral resolution drop with increasing of the slit size. They require coupling to large aperture telescopes with competitive and limited allocation time, which limits their dedication to temporal observations of extended targets such as in comets, planetary atmospheres and large galaxy structures. Because CRSHS can be built in a significantly smaller volume than for classical spectrometers and do not need large aperture telescopes to operate, they can provide a modern, cheap, and accessible method for high-resolution wide field of view (FOV) studies of extended sources from ground and space platforms.

However, it is important to keep in mind that the location $z_0$ of the FLP 116 defined above (FIG. 1C) is a function of the wavelength $\lambda$. Therefore, by changing the heterodyne wavelength $\lambda_0$, $z_0$ should move along the z axis. In order to retain the fringes contrast, it may be required to adjust the output FLP imaging optics or relocate the camera along the z axis in order to accommodate the new FLP location accurately.

Embodiments of a Monolithic Assembly

As stated above, a major weakness of conventional cyclical reflective SHS (CRSHS) instruments is the size and the assembly structure of the system in addition to the routine tuning and calibration maintenance requirements. The core of the CRSHS contains a flat mirror 106, roof mirror 108, and a symmetric grating 104. Conventionally, each of these elements is individually mounted using commercial or custom-made mechanical mounting for the mirror and gratings holders (for instance, on a laboratory bench or tabletop). The performance of the interferometer has tight tolerances, so the holders are adjustable so that the interferometer can be aligned after its assembly. The holding fixtures have to be very firm and inflexible which makes it complicated to adjust the optical mounts. The weight of such an interferometer is dominated by the fixtures (e.g., aluminum or steel fixtures) that are necessary to keep the optical components in position If the commercial mounts are not optimized for stiffness, the interferometer set up will be even more sensitive to unwanted vibration. Also, the overall optical element types of SHS interferometers tend to be relatively heavy as a result of the required mounting systems and have very time-consuming adjustment procedures.

Accordingly, many embodiments are directed to a monolithic CRSHS 100 design (as exemplified in FIGS. 4-11), which offer many important benefits, such as a significant reduction in size and weight, simpler maintenance, and reduced manufacturing and maintenance costs (especially important for commercial applications). With more moving parts, greater attention is required for stress, wear, galling, fatigue, etc. between each interface, and analysis of the instrument can be more difficult. More parts in the design means more parts to be manufactured while still meeting tight tolerance limits, and manufacturing difficulty, cost, and time can become significant issues. Maintenance is also not to be taken lightly, as complicated designs usually call for someone with higher expertise and training (also leading to increased expenses) and can result in extra time needed and more possibilities for error. This disclosure presents embodiments of novel monolithic CRSHS 100 designs that can overcome the shortcomings of conventional CRSHS setups while offering the benefits associated with having a monolithic assembly. Some embodiments of the invention will significantly simplify the production, assembly, and alignment of CRSHS instruments, offering a faster, more flexible, and cost-effective option by avoiding individual optical mounts and holders for each element in the interferometer.

In the prior art, the monolithic SHS assemblies are based on MSHS, not CRSHS. Monolithic CRSHS assemblies 100 are much more difficult to demonstrate, due to not using any refracting optics to hold the main optical elements. In monolithic MSHS, solid, filled glass spacers are generally used to hold and fill the gap between the beamsplitter and the two gratings in each arm. But for monolithic CRSHS 100, the optical path 115 is in the air or vacuum as opposed to solid glass. Additionally, CRSHS has a common-path configuration, which means that any adjustments or additional components to the assembly affect not only one, but both arms of the CRSHS for the path 115 of an incoming beam of light 112. Monolithic MSHS assemblies generally require additional supporting components that, if applied to CRSHS, would interfere with the beam of light 112 or optical configuration 115 in unwanted ways. Thus, it is not possible to produce a monolithic CRSHS design 100 merely by modifying a known monolithic MSHS design.

In accordance with some embodiments of the invention, it is possible to overcome the aforementioned challenges and create a monolithic form factor for CRSHS by employing a novel "hollow" monolithic structure 100, wherein the CRSHS elements (roof mirror 108, flat mirror 106, and symmetric grating 104) are directly and securely affixed to a supporting structure 102. The flat mirror 106 and roof mirror 108 are each disposed at an angle in relation to the symmetric grating 104. In some embodiments, the CRSHS elements are affixed to the supporting structure 102 by mechanical means, such as screws, glue, or other adhesive substances. The monolithic CRSHS 100, in accordance with embodiments of the invention, do not require separate optical mounts or holders to keep the elements in place (unlike conventional CRSHS), as it is designed to have no moving parts.

The schematics provided in FIGS. 1 and 2 illustrate how the supporting structure 102 may hold the flat mirror 106, roof mirror 108, and symmetric grating 104 in place without affecting the common-path configuration. A beam of light 112 can hit the symmetric grating 104 at normal incidence. The symmetric grating 104 then splits the incoming beam 112 into two diffracted beams 114 having anti-symmetrical diffraction orders ($m=\pm 1$) that traverse the optical path 115 with opposite angular alignment in a common-path configuration and are reflected by the roof mirror 108 and flat mirror 106 before diffracting again off the symmetric grating 104. The two diffracted beams 114 then exit the monolithic CRSHS 100. In some embodiments, the supporting structure 102 is a body with a defined internal volume, and the symmetric grating 104, the flat mirror 106, and the roof mirror 108 are affixed to at least one internal wall of said body within said internal volume. In some such embodiments, said body has at least one opening 118 disposed such that the incoming beam of light 112 enters through the opening 118 and hits the symmetric grating 104 at normal incidence. In yet other embodiments, the body has at least two internal walls. FIGS. 4A-4D provide images of some exemplary embodiments of the invention.

The monolithic CRSHS assembly 100 designed in accordance with embodiments of the invention are able to maintain the heterodyne condition, successfully producing visible localized fringe patterns 110. For instance, FIG. 3A shows a simulated ZEMAX raytracing model for an embodiment of the invention, where the angles are set for the wavelength 589 nm. FIG. 3B shows the resulting simulated fringe pattern from a Na hollow cathode lamp (Na D wavelength), and FIG. 3C is an image of the actual produced fringe pattern. Though the supporting structure 102 is not shown on the image in FIG. 3A, a monolithic CRSHS assembly 100 in accordance with an embodiment of the invention was utilized; the optics were not mounted individually.

Figure 4A:
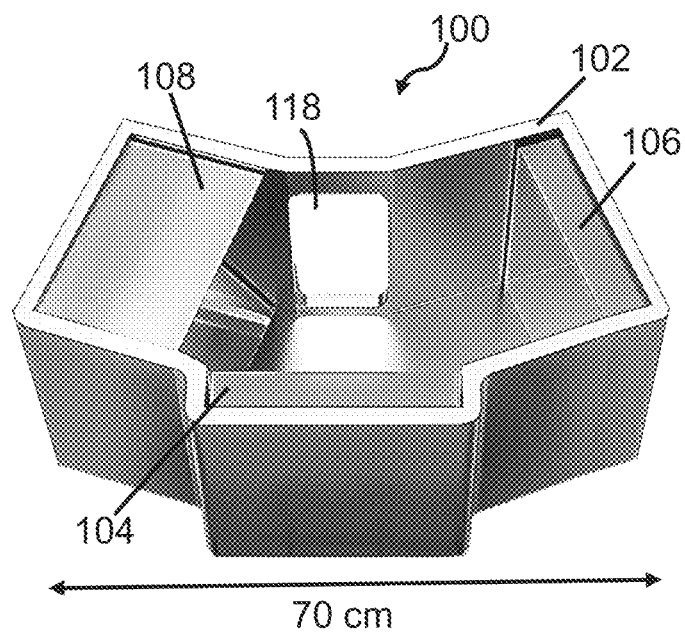
FIGS. 4A and 4B provide images of a monolithic CRSHS formed in accordance with an exemplary embodiment of the current invention.
Figure 4B:
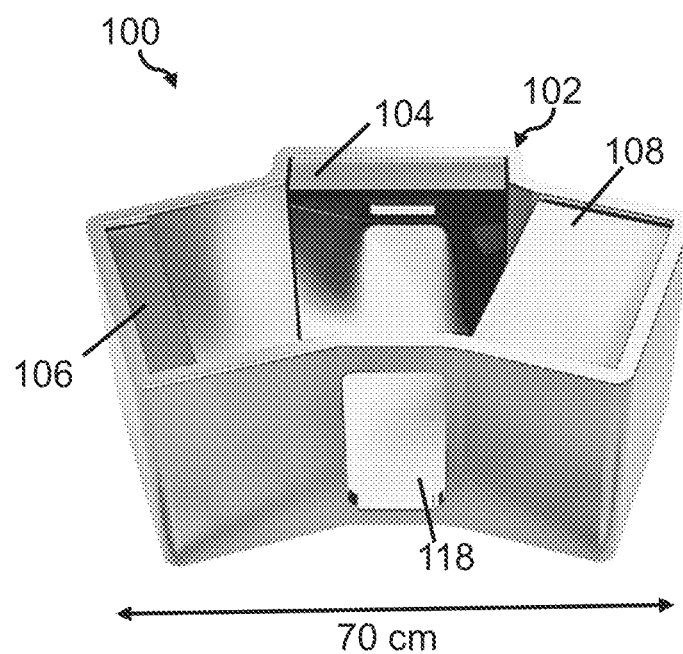

FIGS. 4A-4D demonstrate some exemplary embodiments. In these provided examples, the supporting structure 102 is a body with a defined internal volume, and the symmetric grating 104, the flat mirror 106, and the roof mirror 108 are all securely and directly affixed to at least one internal wall of said body within said internal volume. In these embodiments, the body also an opening 118 disposed such that the incoming beam of light 112 enters through the opening 118 and hits the symmetric grating 104 at normal incidence. The body in these provided embodiments also have at least two internal walls. The exemplary embodiment shown in FIGS. 4A and 4B are turned to a wavelength A of 589 nm and has a distance of about 70 cm between the flat mirror 106 and roof mirror 108.

In exemplary embodiments of the invention, the supporting structure 102 is formed from one material. Having the supporting structure 102 formed from one material is beneficial for bonding and vibration issues. Further, if the temperature changes, the supporting structure 102 will expand at the same rate, and disruptions to the heterodyne wavelength can be minimized. In some exemplary embodiments, by varying the configuration of the supporting structure 102, it is possible to control the effect of temperature variation in a desired amount depending on the application and the environment conditions. In some exemplary embodiments, carbon fiber, aluminum, BK7 glass, fused silica glass, or other suitable materials may be used for the supporting structure 102. In yet other exemplary embodiments, the monolithic format will allow higher optomechanical, vibration, and temperature tolerances while eliminating the need to separately mount the CRSHS elements.

The grating 104, though always symmetric, may have different properties as well in some embodiments of the invention. In some embodiments, the symmetric grating 104 is holographic. In other embodiments, the symmetric grating 104 is non-blazed. In yet other embodiments, the symmetric grating 104 may be sinusoidal or triangular. Some exemplary embodiments use a holographic sinusoidal symmetric grating 104.

Figure 4C:
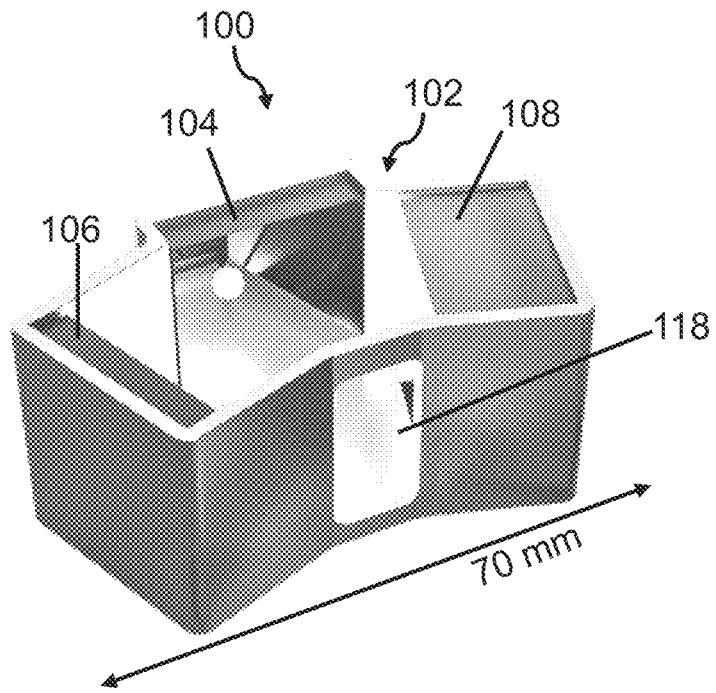
FIG. 4C provides an image of a monolithic CRSHS formed in accordance with another exemplary embodiment of the current invention.
Figure 4D:
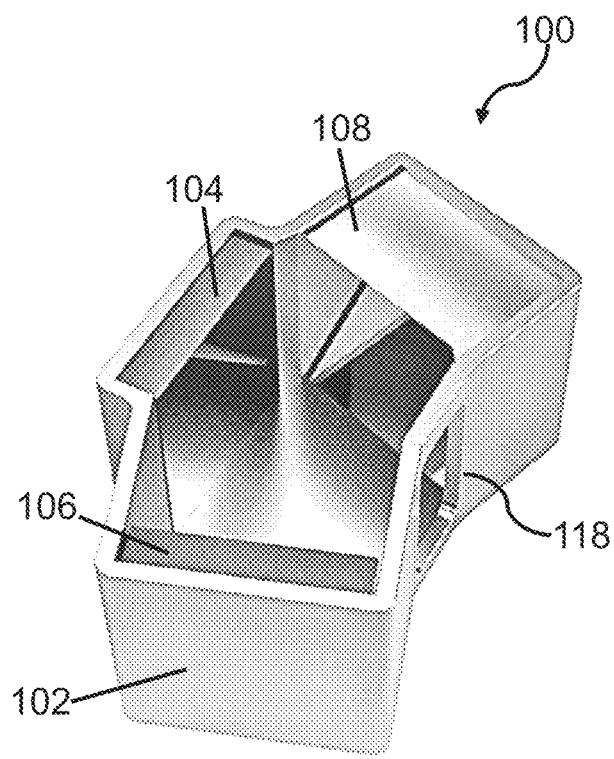
FIG. 4D provides an image of a monolithic CRSHS formed in accordance with yet another exemplary embodiment of the current invention.

By locking the CRSHS in a monolithic design 100 in accordance with some embodiments of the invention (shown in FIGS. 4-11), the robustness of the CRSHS is greatly enhanced, while the CRSHS can be made much lighter and smaller compared to the conventional CRSHS setups. Exemplary embodiments of the novel monolithic CRSHS assembly 100 will, in addition to stabilizing temperature and vibration variations, significantly reduce the system size. For example, FIG. 4C provides an image of an exemplary embodiment where the roof mirror 108 and flat mirror 106 are separated by a distance of only ~70 mm. An exemplary embodiment of the monolithic CRSHS 100 will not have separate parts that need to be aligned together, it will not require skilled personnel for operation or maintenance, and its robust monolithic format will maintain its alignment, requiring little-to-no maintenance.

Embodiments of Field-Widened CRSHS

The FOV is significant for CRSHS because it increases the étendue of the instrument, the capability of an optical system to accept and gather light ($\acute{E}=FOV \times A_{eff}$; where $A_{eff}$ is the collecting area). Provided the source is extended and aperture-filling, the FOV of the CRSHS can fill the same role that a large telescope does for a grating spectrometer. The measure of étendue is widely used to express the sensitivity of an optical instrument. To date, solutions to use outside FOV rays to increase the size of FOV in RSHS systems have not been demonstrated, limiting CRSHS usage for commercial, Earth sciences, and planetary sciences applications. Though there have been methods of field-widening MSHS in the prior art, field-widening CRSHS is much more complicated.

Field-widening usually involves adding at least one optical element into the SHS assembly with the goal of making beams from outside the FOV to appear to be within the FOV limits, widening the instrument's FOV. The instrument's throughput will be increased (without a significant increase in input optical system size), leading to higher sensitivity that provides faster and better data gathering while retaining the advantages of the conventional SHS. In short, field-widening, if done successfully, will enable a smaller, lighter SHS that can be very useful for application requiring minimal volume and weight loadings (e.g., space exploration, portable commercial applications).

As previously described, CRSHS is a cyclical system and uses a roof mirror 108 and flat mirror and one grating, while MSHS is a non-common-path system and uses one beamsplitter and two gratings. Thus, it is much harder to insert an optical element in an CRSHS, since it will affect both arms of the CRSHS—any movement, expansion, or change in the grating or either mirror will affect both diffracted beams simultaneously due to the reflective setup and cyclical common-path configuration. However, to have a working cyclical RSHS, the heterodyne condition must be satisfied— there must be a heterodyne wavelength (as described previously) that results in zero path and phase difference. Additionally, another significant challenge for field-widening RSHS systems is that the diffracted beams must still merge to one FLP location (as shown in FIG. 1). In other words, one, or a combination of, optical elements such as prisms, mirrors, lenses or transmission gratings may be used to bend or compress the off-axes light beam from outside the FOV so they appear inside the FOV, while maintaining a FLP location to record data on the camera using output optics. Both the heterodyne condition and FLP condition must be met at all times for the cyclical RSHS to work, but ensuring the conditions are met is not an easy task. Any additional elements or components will be in the path of both diffracted beams; usually, one arm can be changed favorably, but the other arm will see an opposite effect.

Figure 7A:
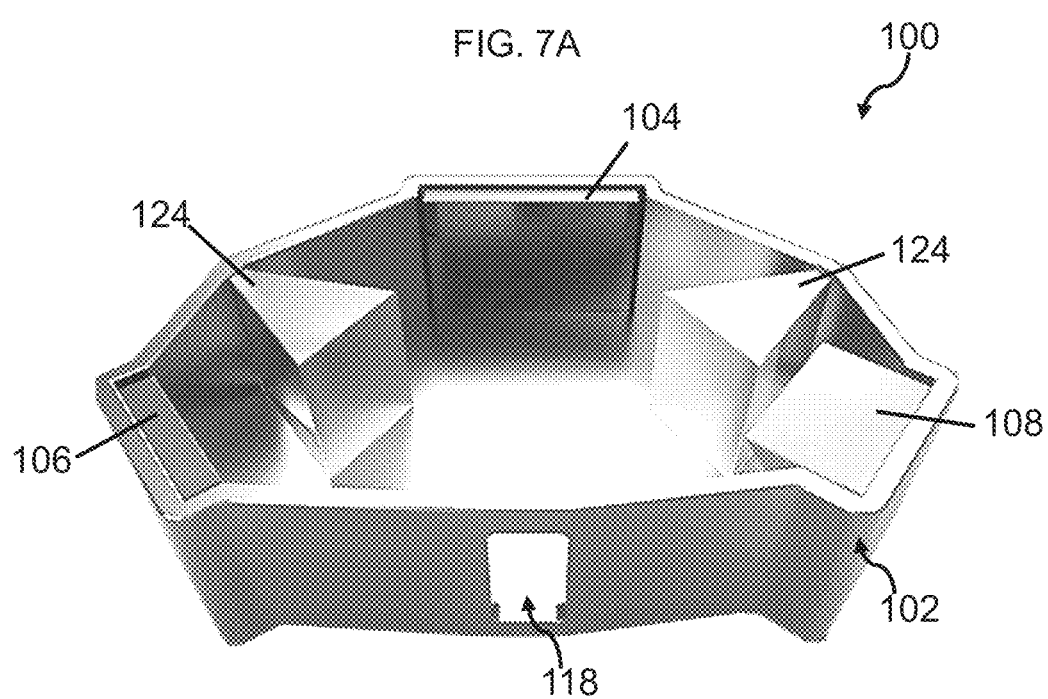
FIGS. 7A and 7B provide images of a field-widened monolithic CRSHS formed in accordance with an exemplary embodiment of the current invention.
Figure 7B:
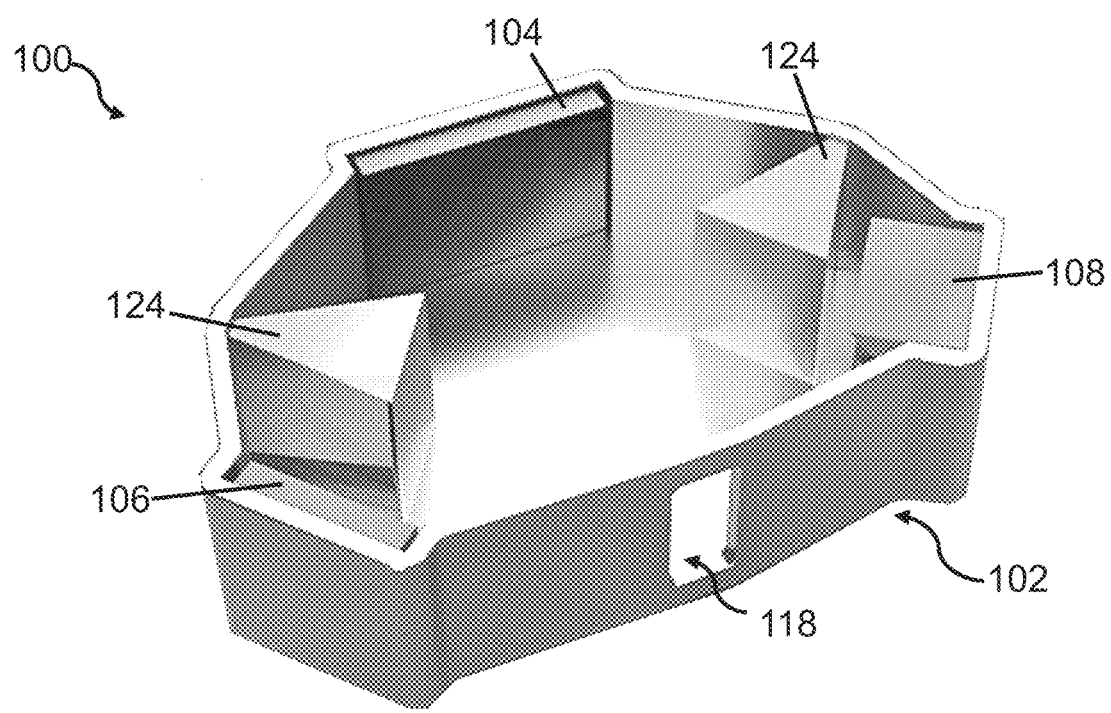
Figure 8A:
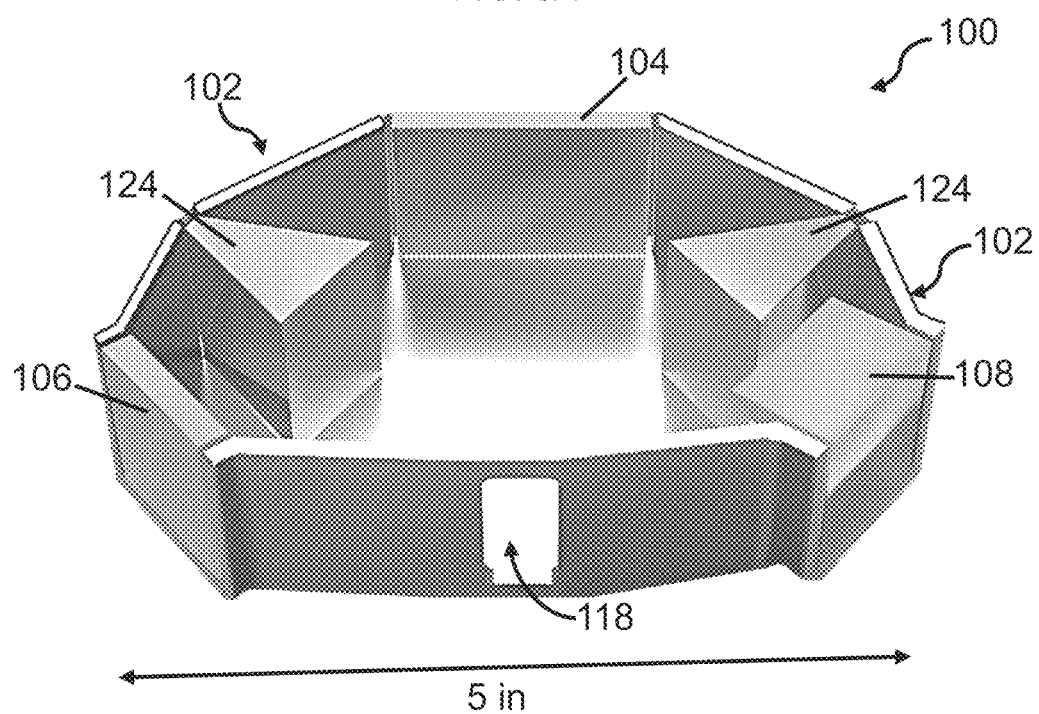
FIGS. 8A and 8B provide images of a field-widened monolithic CRSHS formed in accordance with another exemplary embodiment of the current invention.
Figure 8B:
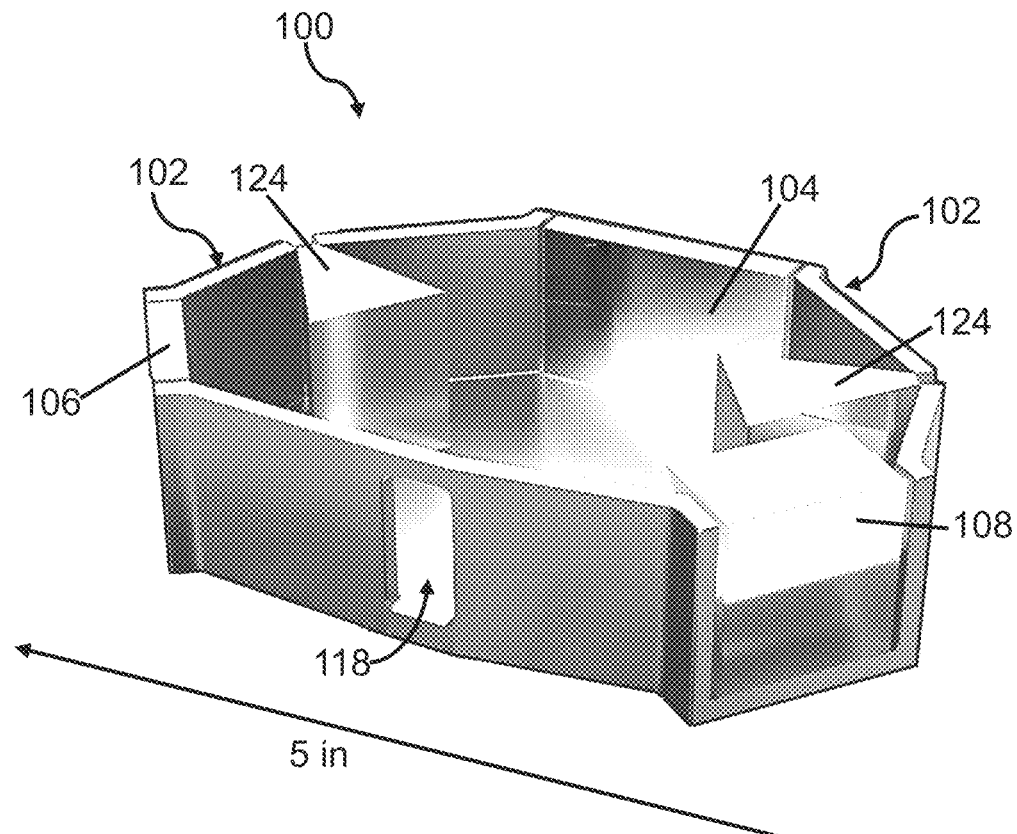
Figure 9:
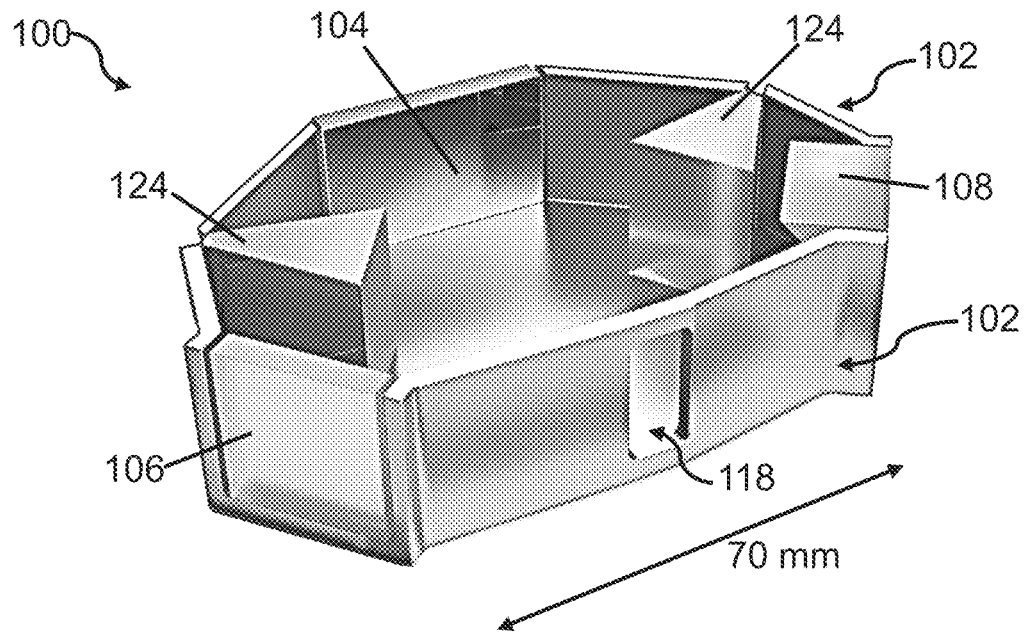
FIG. 9 provides an image of a field-widened monolithic CRSHS in accordance with yet another exemplary embodiment of the current invention.
Figure 10:
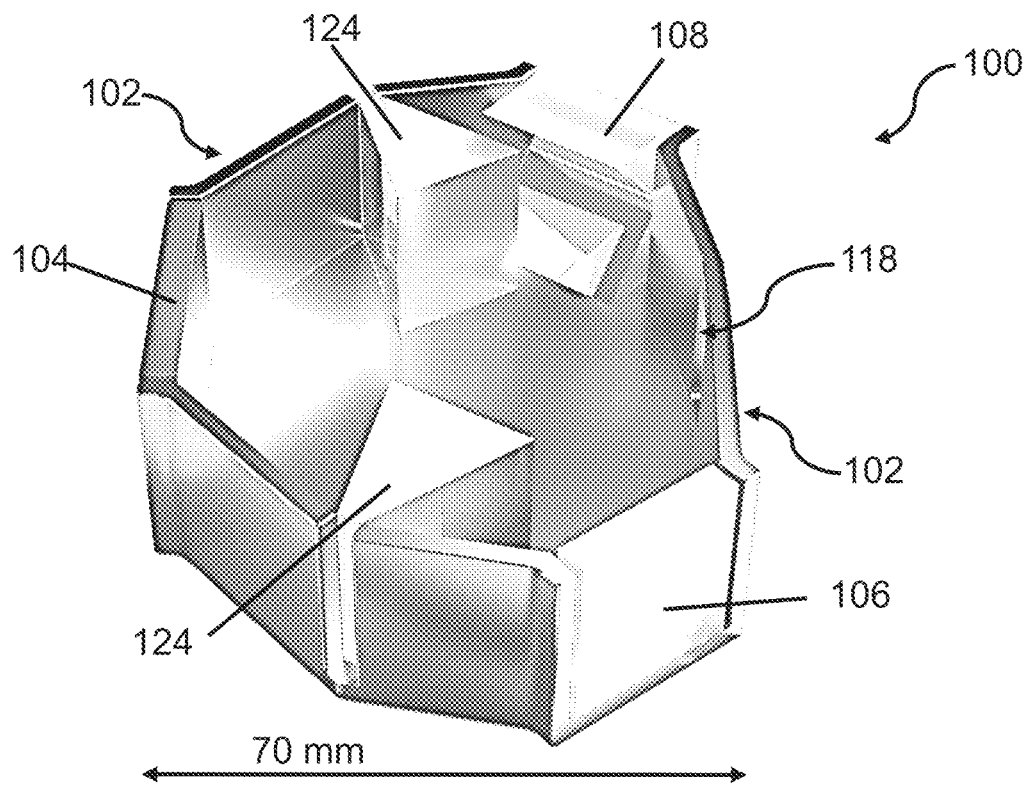
FIG. 10 provides an image of a field-widened monolithic CRSHS in accordance with an exemplary embodiment of the current invention.

Some embodiments of the novel invention employ a design that can widen the FOV while satisfying the required conditions, successfully producing localized fringes. FIG. 5 displays one simulated embodiment of a field-widened CRSHS. In the figure, two wedge prisms (optical elements 124) are inserted into the beam path 115 without disrupting the cyclical configuration. Some exemplary embodiments, having a monolithic assembly 100 in accordance with the invention, are shown in FIGS. 6-11. In these exemplary embodiments, the monolithic CRSHS 100 employs two wedge prisms—one prism 124 located between each mirror (both flat 106 and roof 108) and the symmetric grating 104. The prisms 124 do not hinder the incoming beam of light 112's path to the symmetric grating 104, and the "hollow" monolithic assembly 100 in accordance with embodiments of the invention is maintained. Though the exemplary embodiments use two prisms, other optical elements 124, such as mirrors, transmission gratings, or lenses, may be used. The embodiment in FIG. 6 displays the possibility of having several openings in the supporting structure 102 while maintaining the monolithic CRSHS 100. One difference between the exemplary embodiments shown in FIGS. 7 and 8 is that FIG. 8 illustrates an embodiment where the supporting structure 102 does not cover the back of the symmetric grating 104, optical elements 124, flat mirror 106, and roof mirror 108. FIG. 8 also demonstrates that exemplary embodiments may be constructed with the roof mirror 108 and the flat mirror 106 being separated by a distance of about 6 inches, or 15.24 cm. FIG. 9 shows an exemplary embodiment having a distance of about 70 mm between the roof mirror 108 and flat mirror 106, while FIG. 10 shows an exemplary embodiment having a distance of about 70 mm between the opening 118 and symmetric grating 104.

Figure 11:
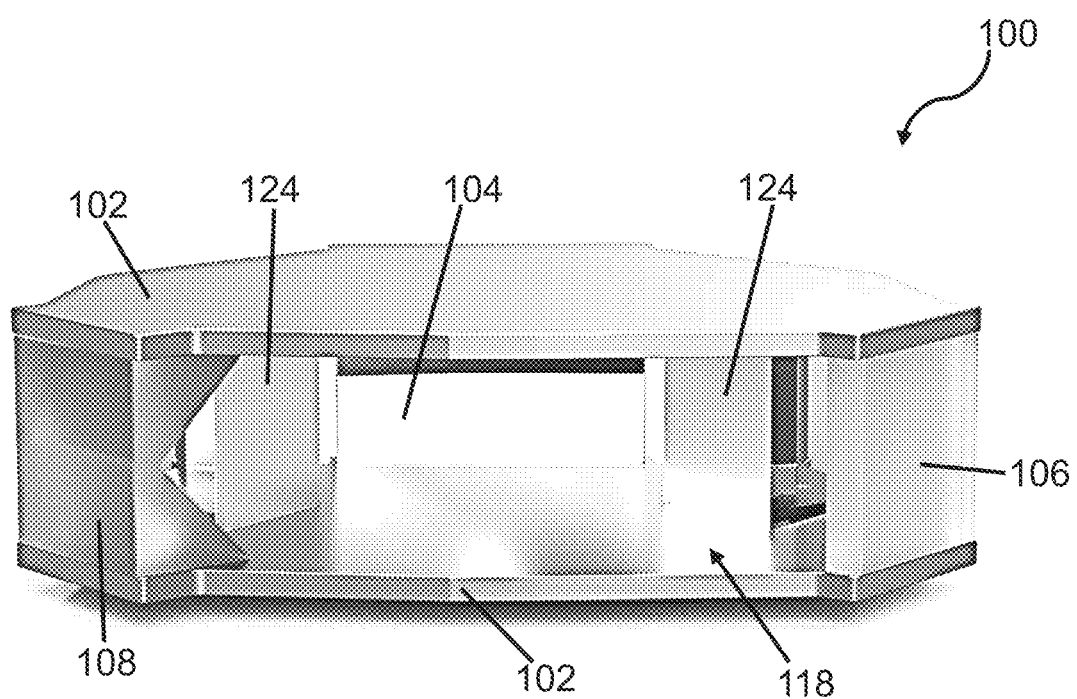
FIG. 11 provides an image of a field-widened monolithic CRSHS in accordance with another exemplary embodiment of the current invention.

Similar to the images in FIGS. 4A-4D, FIGS. 7-11 also show embodiments where the roof mirror 108, the flat mirror 106, optical elements 124, and the symmetric grating 104 are all affixed onto at least one internal wall ("floor") without mechanical holders or mounts. For some other embodiments, it is also possible to have another such internal wall in contact with all components acting as a "ceiling" while maintaining the hollow structure of the monolithic CRSHS 100—one example of this embodiment is shown in FIG. 11. As with some embodiments of the invention mentioned previously, the at least one optical element 124 may be affixed to the panels by an adhesive substance.

Table 1, below, provides information about examples of configurations that are possible with a field-widened, monolithic CRSHS 100 in accordance with an embodiment of the invention:

| Wavelength (nm) | Resolution (angstrom) | Distance between mirrors (cm) | Beam Width (mm) | Grating Groove Density (grooves per mm) | Grating Angle (degrees) |
|---|---|---|---|---|---|
| 308 | 0.2 | 2.5 | 2 | 1800 | 16 |
|  | 0.02 | 4.3 | 15 | 2400 | 21.6 |
|  | 0.01 | 26.7 | 20 | 3000 | 27.5 |
| 589 | .9 | 3.5 | 2 | 800 | 28.1 |
|  | 0.1 | 9.5 | 15 | 1200 | 20.7 |
|  | 0.05 | 31 | 20 | 1400 | 24.3 |

Embodiments of a Fiber-Fed CRSHS

The current state of the art in CRSHS instruments uses free space optics to input target light collected from the target to the CRSHS instrument. The free space optics coupled to the CRSHS mainly determine the size, volume, and configuration of the instrument and lock it to the f# of the incoming beam (f#=the incoming aperture size/distance to focus). With free space optics, the target beam from a light gathering system (in most cases telescopes but also microscopes or other forms of input optics) focuses on the focal plane (FOV stop). The light then travels to a collimating optics to be collimated before entering the interferometer. Depending on the f# of the light beam, more than one collimating optics will be used if one collimating optics cannot collimate the beam to the desired beam width and the required distance does not match the space and configuration available. This conventional use of free space input optics can be a major weakness for CRSHS instruments due to the limitations it places on the location and orientation of the RSHS from the light gathering system (generally telescope or microscopes); the form factor of CRSHS instruments and their size and volume are restricted, making CRSHS inflexible to the environment and user needs; and the CRSHS instrument's ability to be coupled to a telescope or microscope with any obscuration in the target beam path. For instance, Cassegrain or Newtonian telescopes are the most commonly used telescopes, but the shadow of the supporting structure can be an issue.

One solution, in accordance with some embodiments of the invention, is to exchange the free input optics of CRSHS instruments with a coupled optical fiber system. This can be done by focusing an incoming beam into one or more optical fibers and collimating the beam on the other end of the optical fiber into the CRSHS system. In some embodiments, the fiber-fed CRSHS system solve both major issues: (1) this system decouples the form factor of SHS instruments from the telescope or microscope, making it flexible to use and broadening possible applications; and (2) by using single mode fibers, it is possible to get rid of signatures of structures that obscure light (such as the spider pattern from Newtonian and Cassegrain telescopes). Fiber-fed monolithic CRSHS, in accordance with some embodiments of the invention, may be made even more compact for narrow bandpasses. The optical fiber can be used to filter out the unwanted bandpass wavelengths which will eliminate noise and increase sensitivity for the CRSHS without having to use extra filters, while maintaining the R and FOV. In some exemplary embodiments, the input optical fiber folds incoming beams in any direction to accommodate the CRSHS position and installation layout. Fiber optics can also be used in embodiments to divide the FOV and use all the portions or only select a handful portions of the FOV to be used with a smaller detector size. The selection pattern does not need to be fixed and can be machine controlled for higher efficiency and productivity.

Fiber-coupled monolithic CRSHS designs in accordance with some embodiments of the invention may provide lighter fundamentally aligned interferometers that are less sensitive to vibration during the setup as well as in operation. The fiber coupling meets the precision and accuracy required for optical contacting while being much less labor intensive. The free space optics coupling has to be set up by hand, but in some embodiments, the fiber coupling may enable machine automation. This production technique would be cheaper and less time-consuming. Such embodiments with a fiber-fed monolithic CRSHS would be appropriate for a variety of applications, such as satellite instruments, medical devices, oceanography, etc. in the science, commercial, or military sectors. Using optical fibers as input optics, would also mean that the CRSHS can easily be disassembled without risking the alignment of the entire system. In another exemplary embodiment of the invention, the acceptable FOV can be coupled to one single optical fiber system to transport to the CRSHS opening.

The person skilled in the art will recognize that additional embodiments according to the invention are contemplated as being within the scope of the foregoing generic disclosure, and no disclaimer is in any way intended by the foregoing, non-limiting examples.

SUMMARY

To date, no monolithic cyclical reflective spatial heterodyne spectrometers (CRSHS), let alone monolithic CRSHS assembled with field-widening optical components or fiber-optics input, have been reported or successfully demonstrated due to the unique challenges associated with reflective systems and satisfying the heterodyne and fringe localization plane (FLP) conditions. The current invention provides novel approaches that can be generalized for an extremely broad range of wavelengths and applications.

The monolithic assembly for CRSHS will allow higher optomechanical, vibration, and temperature tolerances while eliminating the need for separate mounting of CRSHS elements and complicated maintenance. The monolithic CRSHS will not have any moving parts, meaning it will be easier, cheaper, and faster to manufacture. The monolithic CRSHS in this invention can be further enhanced by inserting one or more optical elements inside the cyclical path so that the CRSHS arms can use rays outside the FOV. This field-widening increases the FOV for CRSHS and increases throughput without affecting the heterodyne condition or FLP location. In addition, a fiber optics input may be used with the monolithic CRSHS, enabling the coupling of input optics with obscuration and easier decoupling of the instrument for various applications and environments.

The aforementioned innovations will enable a more robust, more compact, smaller, lighter monolithic CRSHS than the conventional CRSHS known in the art. The novel assembly will increase throughput and sensitivity while retaining the advantages of basic CRSHS, opening up possibilities for a variety of new commercial and scientific applications.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. A monolithic cyclical reflective spatial heterodyne spectrometer comprising:
    a symmetric grating, said symmetric grating being configured to split an incoming beam of light, having a wavelength $\lambda$, into two diffracted beams traveling in different, angularly offset directions;
    a flat mirror, disposed at a first angle in relation to the symmetric grating; and
    a roof mirror, disposed at a second angle in relation to the symmetric grating;
        wherein the flat mirror and the roof mirror are disposed such that said flat mirror and said roof mirror reflect the diffracted beams in a cyclical common-path configuration such that said diffracted beams diffract again off the symmetric grating to produce a localized fringe pattern; and
    a monolithic supporting structure formed from a single piece of a single material forming a body with a plurality of walls and defining internal volume, wherein each wall in the plurality of walls defines a planar surface;
    wherein the flat mirror, the roof mirror, and the symmetric grating are each securely affixed with an adhesive substance to a different wall in the plurality of walls of said body of said supporting structure; and
    wherein the walls of the supporting structure to which the flat mirror, the roof mirror, and the symmetric grating are affixed are aligned to generate a heterodyne condition at all times, said heterodyne condition being satisfied when there exists a heterodyne wavelength $\lambda_0$ where the two diffracted beams exit the reflective spatial heterodyne spectrometer in normal angle and do not produce a localized fringe pattern.

2. The monolithic cyclical reflective spatial heterodyne spectrometer of claim 1, wherein said body has at least one opening disposed such that the incoming beam of light enters through the opening and hits the symmetric grating at normal incidence.

3. The monolithic cyclical reflective spatial heterodyne spectrometer of claim 1, wherein the body has at least two internal walls.

4. The monolithic cyclical reflective spatial heterodyne spectrometer of claim 1, wherein the roof mirror and the flat mirror are separated by a distance of no more than 70 cm.

5. The monolithic cyclical reflective spatial heterodyne spectrometer of claim 4, wherein the roof mirror and the flat mirror are separated by a distance of no more than 25 cm.

6. The monolithic cyclical reflective spatial heterodyne spectrometer of claim 1, wherein the supporting structure is made from BK7 glass or fused silica.

7. The monolithic cyclical reflective spatial heterodyne spectrometer of claim 5, wherein the roof mirror and the flat mirror are separated by a distance of no more than 10 cm.

8. The monolithic cyclical reflective spatial heterodyne spectrometer of claim 1, wherein an obverse face of each of the symmetric grating, the flat mirror, and the roof mirror are each directly and securely affixed with an adhesive substance to an internal wall within the internal volume of said body of said supporting structure.

9. The monolithic cyclical reflective spatial heterodyne spectrometer of claim 1, wherein the flat mirror, the roof mirror, and the symmetric grating are each securely affixed with an adhesive substance to three walls in the plurality of walls of said body of said supporting structure, such that a back and two sides of each of the flat mirror, the roof mirror, and the symmetric grating affixed to a different wall in the in the plurality of walls of said body of said supporting structure, and wherein the walls to which the back of the flat mirror, the roof mirror, and the symmetric grating are affixed are aligned to generate the heterodyne condition.

10. A field-widened monolithic cyclical reflective spatial heterodyne spectrometer comprising:
- a symmetric grating, said symmetric grating being configured to split an incoming beam of light, having a wavelength $\lambda$, into two diffracted beams traveling in different, angularly offset directions;
- a flat mirror, disposed at a first angle in relation to the symmetric grating;
- a roof mirror, disposed at a second angle in relation to the symmetric grating;
- wherein the flat mirror and the roof mirror are disposed such that said flat mirror and said roof mirror reflect the diffracted beams cyclical common-path configuration such that said diffracted beams diffract again off the symmetric grating to produce a localized fringe pattern;
- at least one optical element; and
- a monolithic supporting structure formed from a single piece of a single material forming a body with a plurality of walls and defining internal volume, wherein each wall in the plurality of walls defines a planar surface;
- wherein the flat mirror, the roof mirror, the symmetric grating, and the at least one optical element are each securely affixed with an adhesive substance to a different wall in the plurality of walls of said body of said supporting structure; and
- wherein the walls of the supporting structure to which the flat mirror, the roof mirror, the symmetric grating, and the at least one optical element are affixed are aligned to generate a heterodyne condition at all times, said heterodyne condition being satisfied when there exists a heterodyne wavelength $\lambda_0$ where the two diffracted beams exit the reflective spatial heterodyne spectrometer in normal angle and do not produce a localized fringe pattern; and
  - wherein the at least one optical element increases throughput and widens field of view while maintaining a fringe localization plane.

11. The field-widened monolithic cyclical reflective spatial heterodyne spectrometer of claim 10, wherein said body has at least one opening disposed such that the incoming beam of light enters through the opening and hits the symmetric grating at normal incidence.

12. The field-widened monolithic cyclical reflective spatial heterodyne spectrometer of claim 10, wherein the body has at least two internal walls.

13. The field-widened monolithic cyclical reflective spatial heterodyne spectrometer of claim 10, wherein the roof mirror and the flat mirror are separated by a distance of no more than 70 cm.

14. The field-widened monolithic cyclical reflective spatial heterodyne spectrometer of claim 13, wherein the flat mirror, the roof mirror, the symmetric grating, and the at least one optical element are affixed to the supporting structure by an adhesive substance.

15. The field-widened monolithic cyclical reflective spatial heterodyne spectrometer of claim 10, wherein the supporting structure is made from BK7 glass or fused silica.

16. The field-widened monolithic cyclical reflective spatial heterodyne spectrometer of claim 10, wherein the at least one optical element is selected from the group consisting of a prism, lens, mirror, or transmission grating.

17. The field-widened monolithic cyclical reflective spatial heterodyne spectrometer of claim 16, wherein the at least one optical element comprises two wedge prisms.

18. The field-widened monolithic cyclical reflective spatial heterodyne spectrometer of claim 14, wherein the roof mirror and the flat mirror are separated by a distance of no more than 10 cm.

19. The field-widened monolithic cyclical reflective spatial heterodyne spectrometer of claim 10, wherein an obverse face of each of the symmetric grating, the flat mirror, the roof mirror, and the at least one optical element are each directly and securely affixed with an adhesive substance to an internal wall within the internal volume of said body of said supporting structure.

20. The field-widened monolithic cyclical reflective spatial heterodyne spectrometer of claim 10, wherein the flat mirror, the roof mirror, and the symmetric grating are each securely affixed with an adhesive substance to three walls in the plurality of walls of said body of said supporting structure, such that a back and two sides of each of the flat mirror, the roof mirror, and the symmetric grating affixed to a different wall in the in the plurality of walls of said body of said supporting structure, and wherein the walls to which the back of the flat mirror, the roof mirror, and the symmetric grating are affixed are aligned to generate the heterodyne condition.

* * * * *